(12) United States Patent
Griess et al.

(10) Patent No.: US 11,312,468 B2
(45) Date of Patent: Apr. 26, 2022

(54) ELONGATE STRUCTURES, STRUCTURAL ASSEMBLIES WITH ELONGATE STRUCTURES, AND METHODS FOR SUPPORTING A STRUCTURAL LOAD

(71) Applicant: The Boeing Company, Chicago, IL (US)

(72) Inventors: Kenneth H. Griess, Kent, WA (US); Karen D. MacKenzie, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 761 days.

(21) Appl. No.: 16/058,230

(22) Filed: Aug. 8, 2018

(65) Prior Publication Data

US 2020/0047867 A1 Feb. 13, 2020

(51) Int. Cl.
*B64C 1/06* (2006.01)

(52) U.S. Cl.
CPC .............. *B64C 1/064* (2013.01); *B64C 1/061* (2013.01); *B64C 1/068* (2013.01)

(58) Field of Classification Search
CPC .......... B64C 1/064; B64C 1/068; B64C 1/061
See application file for complete search history.

(56) References Cited

U.S. PATENT DOCUMENTS

| | | | | |
|---|---|---|---|---|
| 2,617,179 | A * | 11/1952 | Burke | B21C 25/08 29/897.35 |
| 6,648,273 | B2 * | 11/2003 | Anast | B64C 1/12 244/119 |
| 7,823,362 | B2 | 11/2010 | Meyer | |
| 8,353,479 | B2 * | 1/2013 | Tacke | B64C 1/061 244/119 |
| 9,096,324 | B2 * | 8/2015 | Erickson | B64D 37/005 |
| 9,463,866 | B2 * | 10/2016 | Cruz | B29D 99/0014 |
| 9,527,572 | B2 | 12/2016 | Griess et al. | |
| 9,758,232 | B2 * | 9/2017 | Tiryaki | F16B 11/006 |
| 9,950,779 | B2 | 4/2018 | Griess et al. | |
| 2007/0022707 | A1 * | 2/2007 | Gregg | B29C 66/742 52/837 |
| 2008/0067289 | A1 * | 3/2008 | Meyer | B64C 1/064 244/131 |
| 2013/0089712 | A1 * | 4/2013 | Kwon | B64C 1/12 428/174 |

(Continued)

FOREIGN PATENT DOCUMENTS

| | | |
|---|---|---|
| DE | 10 2008057247 | 1/2010 |
| EP | 2 960 150 | 12/2015 |
| EP | 3 219 602 | 9/2017 |

OTHER PUBLICATIONS

European Patent Office, "Communication pursuant to Article 94(3) EPC," App. No. 19 174 854.0 dated (Sep. 24, 2020).

(Continued)

*Primary Examiner* — Nicholas McFall
(74) *Attorney, Agent, or Firm* — Walters & Wasylyna LLC

(57) ABSTRACT

A structural assembly includes a support structure and an elongate structure intersecting the support structure. The elongate structure has a length and a mass. The mass of the elongate structure varies along the length of the elongate structure. A localized mass of the elongate structure decreases toward the support structure and increases away from the support structure.

20 Claims, 20 Drawing Sheets

(56) References Cited

U.S. PATENT DOCUMENTS

| | | | | |
|---|---|---|---|---|
| 2013/0187001 A1* | 7/2013 | Gensch | .................... | F16L 3/00 |
| | | | | 244/119 |
| 2013/0209746 A1* | 8/2013 | Reighley | ............ | B29D 99/0014 |
| | | | | 428/172 |
| 2015/0059142 A1* | 3/2015 | De Jong | ................. | B29C 73/04 |
| | | | | 29/402.14 |
| 2015/0083861 A1* | 3/2015 | Alby | ....................... | B64C 3/182 |
| | | | | 244/119 |
| 2015/0283745 A1 | 10/2015 | Chinni Vergottini et al. | | |
| 2015/0375843 A1* | 12/2015 | Griess | .................... | B64C 3/182 |
| | | | | 244/133 |
| 2016/0009355 A1* | 1/2016 | Jansen | ................... | B64C 1/064 |
| | | | | 137/1 |
| 2016/0375632 A1* | 12/2016 | Hallander | .......... | B29D 99/0014 |
| | | | | 428/156 |

OTHER PUBLICATIONS

European Patent Office, Extended European Search Report, App. No. 19174854.0 dated (Oct. 23, 2019).
European Patent Office, "Communication pursuant to Article 94(3) EPC," App. No. 19 174 854.0 dated (Mar. 29, 2021).

\* cited by examiner

ELONGATE STRUCTURES, STRUCTURAL ASSEMBLIES WITH ELONGATE STRUCTURES, AND METHODS FOR SUPPORTING A STRUCTURAL LOAD

FIELD

The present disclosure is generally related to structural assemblies and, more particularly, to structural assemblies with elongate structures, such as aircraft structures with stringers.

BACKGROUND

Structural assemblies are available in a wide variety of configurations to provide structural support to a structure under a variety of loading conditions. Often, such structural assemblies include structural support members and elongated structural members that are coupled to the structural support members. Such structural support members and elongated structural members serve as load-bearing components of the framework of the structural assembly. Often, such elongated structural members provide flexural and torsional stiffness to the structural assembly at locations between the structural support members. Many such structural assemblies are used in the construction of vehicle structures, such as aircraft, and other stand-alone structures.

In an example, wing and fuselage assemblies of an aircraft typically include parallel, elongated structural members called stringers or stiffeners. Such stringers are typically operably coupled to skin members of the wing and fuselage that cooperatively provide the desired flexural and torsional stiffness to the wing and fuselage surfaces. The stringer may include a portion, such as a planar web portion, that is generally oriented in a direction approximately perpendicular to a corresponding skin member and that extends in a spanwise direction along the wing surface or a longitudinal direction along the fuselage surface so that the stringer resists a bending moment generated by a loading condition.

Although such elongated structural members may offer certain superior bending stiffness properties over other design configurations, one issue that may tend to limit the usage of certain elongated structural members is the difficulty of attaching the elongated structural member to adjacent structural support members of the structural assembly with adequate load transfer at a region of attachment without an undue increase in weight and cost. For example, attachment fittings may be required to facilitate proper attachment of certain elongated structural members to various types of related structural support members, such as wing frame members or fuselage frame members. While in certain situations it can be relatively easy to attach certain elongated structural members when the applied loads are low, it may be challenging to do so for a highly loaded structure.

Designing elongated structural members, such as stringers, with a desired weight and performance characteristics may also be challenging. For example, an elongated structural member with desired performance characteristics may be more structurally and geometrically complex than desired or may weigh more than desired. With increased structural and geometrical complexity, the time and cost for manufacturing such elongated structural members may also increase. For example, if an elongated structural member has a desired weight, the performance characteristics of the elongated structural member may be such that additional elongated structural members may be required where a single elongated structural member is desired.

Accordingly, those skilled in the art continue with research and development efforts in the field of structural assemblies having elongated structural members and, as such, elongate structures, structural assemblies with elongate structures, and methods for supporting structural loads, intended to address the above-identified concerns, would find utility.

SUMMARY

The following is a non-exhaustive list of examples, which may or may not be claimed, of the subject matter according to the present disclosure.

In an example, a structural assembly includes a support structure and an elongate structure intersecting the support structure. The elongate structure has a length and a mass. The mass of the elongate structure varies along the length of the elongate structure. A localized mass of the elongate structure decreases toward the support structure and increases away from the support structure.

In an example, an elongate structure for a structural assembly has a length and a mass and includes a web extending the length of the elongate structure and a lower flange extending from the web. The elongate structure is configured to intersect a support structure of the structural assembly. The mass of the elongate structure varies along the length of the elongate structure. A localized mass of the elongate structure is decreased along at least one portion of the length of the elongate structure is increased along at least one other portion of the length of the elongate structure.

In an example, a method for supporting a structural load in a structural assembly, which includes a support structure and an elongate structure intersecting the support structure, includes steps of: (1) loading the structural load onto the elongate structure, the elongate structure having a mass that varies along at least a portion of a length of the elongate structure, wherein a localized mass of the elongate structure decreases toward the support structure and increases away from the support structure; (2) reacting the structural load to resist a bending moment; and (3) unloading the structural load on the elongate structure.

Other examples of the disclosed structural assembly, elongate structure, and methods will become apparent from the following detailed description, the accompanying drawings and the appended claims.

DETAILED DESCRIPTION

Figure 1:
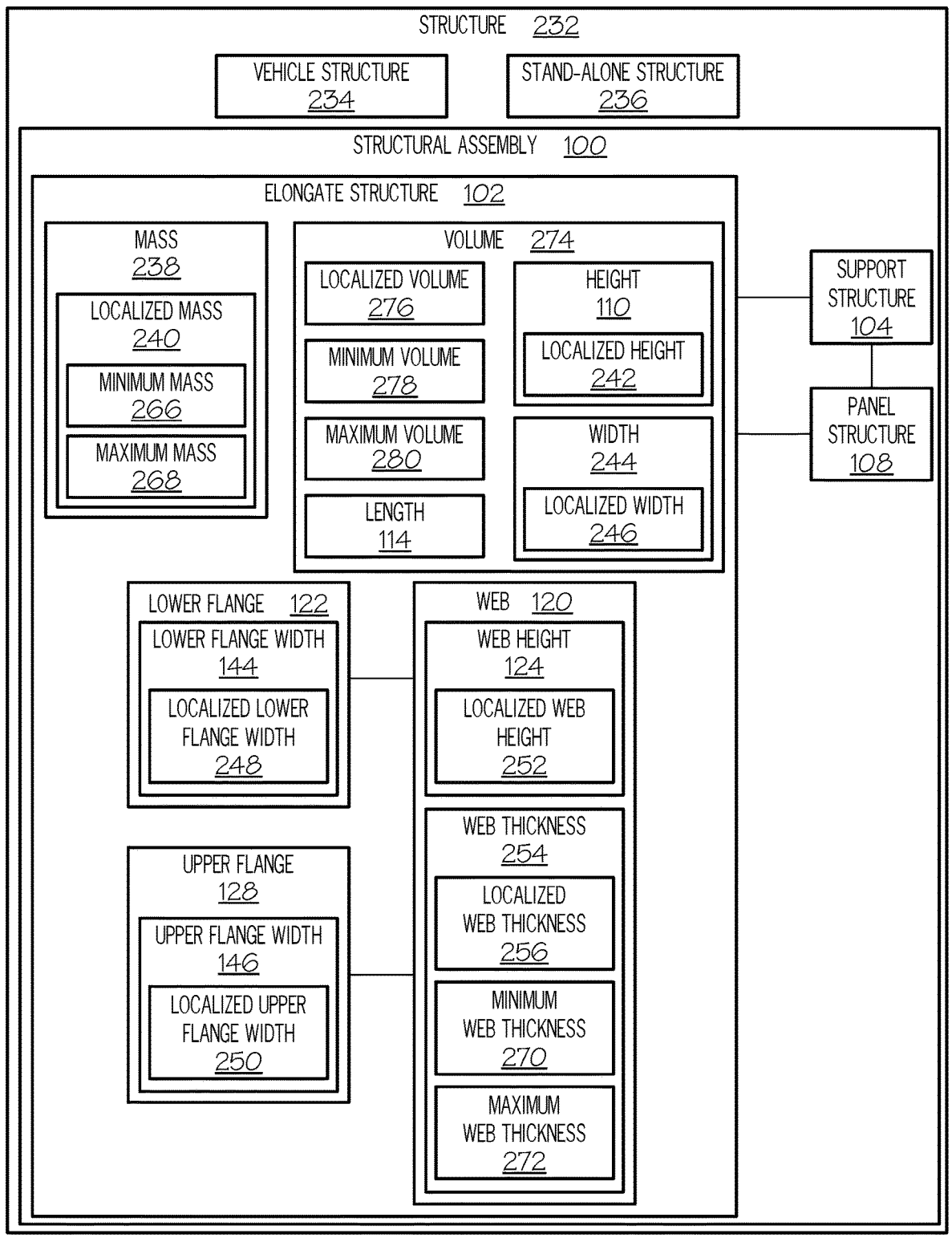
FIG. 1 is a schematic block diagram of an example of a structure and a structural assembly of the structure.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrases "an example," "some examples," and similar language throughout the present disclosure may, but do not necessarily, refer to the same example. Further, the subject matter characterizing any one example may, but does not necessarily, include the subject matter characterizing any other example.

The present disclosure provides examples of elongate structures, structural assemblies that utilize elongate structures, methods for supporting structural loads with structural assemblies that utilize elongate structures, and methods for fabricating elongate structures and structural assemblies that utilize elongate structures. Such elongate structures may be used, for example, to increase strength, to carry loads, to transfer loads, and to resist bending moments generated by loads. Examples of the disclosed elongate structures have at least one of variable mass and/or variable volume along at least a portion of their lengths. In some examples of the disclosed elongate structures, this variable mass and/or variable volume is achieved by the elongate structure having at least one of a variable height, a variable width, and/or a variable web thickness along at least a portion of its length. The variable mass and/or variable volume of such elongate structures may provide resistance to localized failure of one or more portions of the elongate structure due to lateral buckling. Examples of the disclosed structural assemblies include such elongate structures, which are operatively coupled to at least one support structure of the structural assembly. Examples of the elongate structures, the structural assemblies, and the methods disclosed herein may be used with a variety of structures. More particularly, examples of the elongate structures, the structural assemblies, and the methods disclosed herein may be used with a variety of vehicle structures, such as aircraft, spacecraft, motor craft, watercraft, and other craft, and a variety of other stand-alone structures where it is desirable to have a lightweight, strong structure.

FIG. 1 illustrates an example of a structure 232 that is constructed, or otherwise fabricated, utilizing at least one structural assembly 100. In some examples, the structure 232 is, or takes the form of, a vehicle structure 234. For example, the vehicle structure 234 may form at least a portion of any type of vehicle, such as an aircraft, a spacecraft, a motor craft, a watercraft, and the like. In some examples, the structure 232 is, or takes the form of, a stand-alone structure 236. For example, the stand-alone structure 236 may form at least a portion of a permanent or temporary building, a rocket, a satellite, or any other type of manufactured structure.

In some examples, the structural assembly 100 includes at least one support structure 104 and at least one elongate structure 102. Typically, the structure 232 includes a plurality of structural assemblies 100. While only a single structural assembly 100 including a single support structure 104 and a single elongate structure 102 is illustrated in FIG. 1, generally, each one of the structural assemblies 100, for example, forming the structure 232, includes a plurality of support structures 104 and a plurality of elongate structures 102. In some examples, at least one of the elongate structures 102 intersects or forms a junction with at least one of the support structures 104. In some examples, at least one of the elongate structures 102 extends between an adjacent and opposed pair of support structures 104. In some examples, at least one of the elongate structures 102 is operatively coupled with at least one of the support structures 104, such as to transfer a load from the elongate structure 102 to the support structure 104.

For the purpose of this disclosure, the terms "intersect," "intersecting," "intersection," and variations thereof have their ordinary meaning to those skilled in the art and, for example, refer to two or more items meeting each other, passing across each other, or otherwise forming a junction between each other.

In some examples, the structural assembly 100 includes at least one panel structure 108. While the structural assembly 100 illustrated in FIG. 1 includes a single panel structure 108, generally, each one of the structural assemblies 100, for example, forming the structure 232, includes a plurality of panel structures 108. In some examples, the panel structure 108 forms an exterior of the structural assembly 100 or a portion of an exterior of the structure 232.

In some examples, the elongate structure 102 is operatively coupled with the panel structure 108, such as to transfer a load from the panel structure 108 to the elongate structure 102. In some examples, the support structure 104 is operatively coupled with the panel structure 108, such as to transfer a load from the panel structure 108 to the support structure 104.

Generally, the elongate structure 102 (or each one of the plurality of elongate structures 102) has a geometry defined by a length 114, a height 110, and a width 244. The elongate structure 102 also has a volume 274 defined by the geometry of the elongate structure 102. The elongate structure 102 also has a mass 238 defined by the material composition of the elongate structure 102 and the geometry (e.g., the volume 274) of the elongate structure 102.

In some examples, the mass 238 of the elongate structure 102 is variable (e.g., includes a variable mass) along the length 114 of the elongate structure 102. In other words, a localized mass 240 of the elongate structure 102 varies throughout one or more portions of the length 114 of the elongate structure 102. For the purpose of this disclosure, the term "localized mass" refers to the mass 238 of the elongate structure 102 at a particular region, area, or location along the length 114 of the elongate structure 102. In some examples, the mass 238 varies continuously along the length 114 of the elongate structure 102. In some examples, the mass 238 has both portions of constant localized mass 240 along certain lengths of the elongate structure 102 and portions of variable localized mass 240 along other certain (e.g., different) lengths of the same elongate structure 102.

In some examples, the mass 238 of the elongate structure 102 decreases, or is reduced, proximate to (e.g., at or near) the support structure 104. In an example, the localized mass 240 of the elongate structure 102 located proximate to or residing at the support structure 104 is, or defines, a minimum localized mass (also referred to herein as minimum mass 266) of the elongate structure 102.

In some examples, the mass 238 of the elongate structure 102 increases from the support structure 104 to a location along the length 114 of the elongate structure 102 that is spaced away from the support structure 104. In an example, the localized mass 240 of the elongate structure 102 located away from the support structure 104 is, or defines, a maximum localized mass (also referred to herein as maximum mass 268) of the elongate structure 102.

In some examples, the localized mass 240 of the elongate structure 102 located at an intersection or junction of the elongate structure 102 and at least one of a pair of support structures 104 is, or defines, the minimum mass 266 of the elongate structure 102. In some examples, the localized mass 240 of the elongate structure 102 located midway between the pair of support structures 104 is, or defines, the maximum mass 268 of the elongate structure 102.

In some examples, the portions of the elongate structure 102 in which the localized mass 240 is increased (e.g., to the maximum mass 268) are selected at locations along the length 114 of the elongate structure 102 in which buckling in response to loading is most likely to occur, such as at the location spaced away from the support structure 104 or between the adjacent pair of support structures 104. Similarly, the portions of the elongate structure 102 in which the localized mass 240 is decreased (e.g., to the minimum mass 266) are selected at locations along the length 114 of the elongate structure 102 in which buckling in response to loading is least likely to occur, such as proximate to the support structures 104. Such selective locations of the minimum masses 266 and the maximum masses 268 of the elongate structure 102 beneficially enable optimization of material and weight of the elongate structure 102 and strength-to-weight requirements sufficient to react to the loads applied to the structural assembly 100 by increasing the mass 238 where it is needed to support the structural loads and decreasing the mass 238 where it is not needed to support the structural loads.

In some examples, the volume 274 of the elongate structure 102 is variable (e.g., includes a variable volume) along the length 114 of the elongate structure 102. In other words, a localized volume 276 240 of the elongate structure 102 varies throughout one or more portions of the length 114 of the elongate structure 102. For the purpose of this disclosure, the term "localized volume" refers to the volume 274 of the elongate structure 102 at a particular region, area, or location along the length 114 of the elongate structure 102. In some examples, the volume 274 varies continuously along the length 114 of the elongate structure 102. In some examples, the volume 274 has both portions of constant localized volume 276 along certain lengths of the elongate structure 102 and portions of variable localized volume 276 along other certain (e.g., different) lengths of the same elongate structure 102.

In some examples, the volume 274 of the elongate structure 102 decreases, or is reduced, proximate to (e.g., at or near) the support structure 104. In an example, the localized volume 276 of the elongate structure 102 located proximate to or residing at the support structure 104 is, or defines, a minimum localized volume (also referred to herein as minimum volume 278) of the elongate structure 102.

In some examples, the volume 274 of the elongate structure 102 increases from the support structure 104 to a location along the length 114 of the elongate structure 102 that is spaced away from the support structure 104. In an example, the localized volume 276 of the elongate structure 102 located away from the support structure 104 is, or defines, a maximum localized volume (also referred to herein as maximum volume 280) of the elongate structure 102.

In some examples, the localized volume 276 of the elongate structure 102 located at an intersection or junction of the elongate structure 102 and at least one of a pair of support structures 104 is, or defines, the minimum volume 278 of the elongate structure 102. In some examples, the localized volume 276 of the elongate structure 102 located midway between the pair of support structures 104 is, or defines, the maximum volume 280 of the elongate structure 102.

In some examples, the portions of the elongate structure 102 in which the localized volume 276 is increased (e.g., to the maximum volume 280) are selected at locations along the length 114 of the elongate structure 102 in which buckling in response to loading is most likely to occur, such as at the location spaced away from the support structure 104 or between the adjacent pair of support structures 104. Similarly, the portions of the elongate structure 102 in which the localized volume 276 is decreased (e.g., to the minimum volume 278) are selected at locations along the length 114 of the elongate structure 102 in which buckling in response to loading is least likely to occur, such as proximate to the support structures 104. Such selective locations of the minimum volumes 278 and the maximum volumes 280 of the elongate structure 102 beneficially enable optimization of material and space requirements of the elongate structure 102 and strength-to-weight requirements sufficient to react to the loads applied to the structural assembly 100 by increasing the volume 274 where it is needed to support the structural loads and decreasing the volume 274 where it is not needed to support the structural loads.

In some examples, at least one of the variable mass 238 and/or the variable volume 274 is achieved, or accomplished, by varying the height 110 of the elongate structure 102 along the length 114 of the elongate structure 102. In other words, a localized height 242 of the elongate structure 102 varies throughout one or more portions of the length 114 of the elongate structure 102. For the purpose of this disclosure, the term "localized height" refers to the height 110 of the elongate structure 102 at a particular region, area, or cross-sectional location along the length 114 of the elongate structure 102. In some examples, the height 110 varies continuously along the length 114 of the elongate structure 102. In some examples, the height 110 has both portions of constant localized height 242 along certain lengths of the elongate structure 102 and portions of variable localized height 242 along other certain (e.g., different) lengths of the same elongate structure 102.

In some examples, the height 110 of the elongate structure 102 decreases, or is reduced, proximate to (e.g., at or near) the support structure 104 in order to decrease at least one of the mass 238 and/or the volume 276 of the elongate structure 102. In an example, the localized height 242 of the elongate structure 102 located proximate to or residing at the support structure 104 is, or defines, a minimum localized height (also referred to herein as minimum height 116) of the elongate structure 102 corresponding to the minimum mass 266 of the elongate structure 102.

In some examples, the height 110 of the elongate structure 102 increases from the support structure 104 to a location along the length 114 of the elongate structure 102 that is spaced away from the support structure 104 in order to increase at least one of the mass 238 and/or the volume 276 of the elongate structure 102. In an example, the localized height 242 of the elongate structure 102 located away from the support structure 104 is, or defines, a maximum localized height (also referred to herein as maximum height 118) of the elongate structure 102 corresponding to the maximum mass 268 of the elongate structure 102.

In some examples, at least one of the variable mass 238 and/or the variable volume 274 is achieved, or accomplished, by varying the width 244 of the elongate structure 102 along the length 114 of the elongate structure 102. In other words, a localized width 246 of the elongate structure 102 varies throughout one or more portions of the length 114 of the elongate structure 102. For the purpose of this disclosure, the term "localized width" refers to the width 244 of the elongate structure 102 at a particular region, area, or cross-sectional location along the length 114 of the elongate structure 102. In some examples, the width 244 varies continuously along the length 114 of the elongate structure 102. In some examples, the width 244 has both portions of constant localized width 246 along certain lengths of the elongate structure 102 and portions of variable localized width 246 along certain other (e.g., different) lengths of the same elongate structure 102.

In some examples, the width 244 of the elongate structure 102 decreases, or is reduced, proximate to (e.g., at or near) the support structure 104 in order to decrease at least one of the mass 238 and/or the volume 276 of the elongate structure 102. In an example, the localized width 246 of the elongate structure 102 located proximate to or residing at the support structure 104 is, or defines, a minimum localized width (also referred to herein as minimum width) of the elongate structure 102 corresponding to the minimum mass 266 of the elongate structure 102.

In some examples, the width 244 of the elongate structure 102 increases from the support structure 104 to a location along the length 114 of the elongate structure 102 that is spaced away from the support structure 104 in order to increase at least one of the mass 238 and/or the volume 276 of the elongate structure 102. In an example, the localized width 244 of the elongate structure 102 located away from the support structure 104 is, or defines, a maximum localized width (also referred to herein as maximum width) of the elongate structure 102 corresponding to the maximum mass 268 of the elongate structure 102.

In some examples, the elongate structure 102 includes a web 120. Generally, the web 120 is oriented perpendicular to the panel structure 108. The web 120 has a web height 124 and a web thickness 254. The web height 124 at least partially defines the height 110 of the elongate structure 102.

For the purpose of this disclosure, terms relating to location, position, and/or orientation of an item relative to another item, such as perpendicular, parallel, and similar terms, include both a condition in which the location, position, and/or orientation is exactly as stated (to the extend that it may be perceived as being exact) and a condition in which the location, position, and/or orientation is approximately as stated. For the purpose of this disclosure, the term "approximately" refers to or represents a condition that is close to, but is not exactly, the stated condition that still performs the desired function or achieves the desired result. For example, the term "approximately" may refer to a condition that is within less than 10% of the stated condition.

In some examples, at least one of the variable mass 238 and/or the variable volume 274 is achieved, or accomplished, by varying the web height 124 of the web 120 along the length 114 of the elongate structure 102. In other words, a localized web height 252 of the web 120 varies throughout one or more portions of the length 114 of the elongate structure 102. For the purpose of this disclosure, the term "localized web height" refers to the web height 124 of the web 120 at a particular region, area, or cross-sectional location along the length 114 of the elongate structure 102. In some examples, the web height 124 varies continuously along the length 114 of the elongate structure 102. In some examples, the web height 124 has both portions of constant localized web height 252 along certain lengths of the elongate structure 102 and portions of variable localized web height 252 along certain other (e.g., different) lengths of the same elongate structure 102.

In some examples, the web height 124 of the web 120 of the elongate structure 102 decreases, or is reduced, proximate to (e.g., at or near) the support structure 104 in order to decrease at least one of the mass 238 and/or the volume 276 of the elongate structure 102. In an example, the localized web height 252 of the web 120 located proximate to or residing at the support structure 104 is, or defines, a minimum localized web height (also referred to herein as minimum web height 132) of the elongate structure 102 corresponding to the minimum mass 266 of the elongate structure 102.

In some examples, the web height 124 of the web 120 of the elongate structure 102 increases from the support structure 104 to a location along the length 114 of the elongate structure 102 that is spaced away from the support structure 104 in order to increase at least one of the mass 238 and/or the volume 276 of the elongate structure 102. In an example, the localized web height 252 of the web 120 located away from the support structure 104 is, or defines, a maximum localized web height (also referred to herein as maximum web height 134) of the elongate structure 102 corresponding to the maximum mass 268 of the elongate structure 102.

In some examples, at least one of the variable mass 238 and/or the variable volume 274 is achieved, or accomplished, by varying the web thickness 254 of the web 120 along the length 114 of the elongate structure 102. In other words, a localized web thickness 256 of the web 120 varies throughout one or more portions of the length 114 of the elongate structure 102. For the purpose of this disclosure, the term "localized web thickness" refers to the web thickness of the web 120 at a particular region, area, or cross-sectional location along the length 114 of the elongate structure 102. In some examples, the web thickness 254 varies continuously along the length 114 of the elongate structure 102. In some examples, the web thickness 254 has both portions of constant localized web thickness 256 along certain lengths of the elongate structure 102 and portions of variable localized web thickness 256 along certain other (e.g., different) lengths of the same elongate structure 102.

In some examples, the web thickness 254 of the web 120 of the elongate structure 102 decreases, or is reduced, proximate to (e.g., at or near) the support structure 104 in order to decrease at least one of the mass 238 and/or the volume 276 of the elongate structure 102. In an example, the localized web thickness 256 of the web 120 located proximate to or residing at the support structure 104 is, or defines, a minimum localized web thickness (also referred to herein as minimum web thickness 270) of the elongate structure 102 corresponding to the minimum mass 266 of the elongate structure 102.

In some examples, the web thickness 254 of the web 120 of the elongate structure 102 increases from the support structure 104 to a location along the length 114 of the elongate structure 102 that is spaced away from the support structure 104 in order to increase at least one of the mass 238 and/or the volume 276 of the elongate structure 102. In an example, the localized web thickness 256 of the web 120 located away from the support structure 104 is, or defines, a maximum localized web thickness (also referred to herein as maximum web thickness 272) of the elongate structure 102 corresponding to the maximum localized mass of the elongate structure 102.

In some examples, the elongate structure 102 includes at least one of a lower flange 122 and an upper flange 128. In some examples, the web 120 is coupled to and extends from the lower flange 122. In some examples, the web 120 is coupled to and extends between the lower flange 122 and the upper flange 128. The lower flange 122 has a lower flange width 144 and the upper flange 128 has an upper flange width 248. The width 244 of the elongate structure 102 is at least partially defined by one of the lower flange width 144 and/or the upper flange width 146. It should be noted that, for the purpose of this disclosure, relative terms, such as "lower," "base," "upper," "top," "bottom," etc. refer to the relative position and/or orientation of an item, for example, as illustrated in a corresponding figure view.

In some examples, at least one of the variable mass 238 and/or the variable volume 276 is achieved, or accomplished, by varying at least one of the lower flange width 144 and/or the upper flange width 146 of the elongate structure 102 along the length 114 of the elongate structure 102. In other words, a localized lower flange width 248 and/or a localized upper flange width 250 vary throughout one or more portions of the length 114 of the elongate structure 102. For the purpose of this disclosure, the terms "localized lower flange width" and "localized upper flange width" refer to the width of the respective lower flange 122 and upper flange 128 at a particular region, area, or cross-sectional location along the length 114 of the elongate structure 102. In some examples, the lower flange width 144 and/or the upper flange width 146 vary continuously along the length 114 of the elongate structure 102. In some examples, the lower flange width 144 and/or the upper flange width 146 have both portions of constant localized lower flange width 248 and/or a localized upper flange width 250 along certain lengths of the elongate structure 102 and portions of variable localized lower flange width 248 and/or a localized upper flange width 250 along certain other (e.g., different) lengths of the same elongate structure 102.

In some examples, the lower flange width 144 and/or the upper flange width 146 of the elongate structure 102 decrease, or are reduced, proximate to (e.g., at or near) the support structure 104 in order to decrease at least one of the mass 238 and/or the volume 274 of the elongate structure 102. In an example, the localized lower flange width 248 and/or a localized upper flange width 250 of the elongate structure 102 located proximate to or residing at the support structure 104 is, or defines, a minimum localized lower flange width (also referred to herein as minimum lower flange width) and/or a minimum localized upper flange width (also referred to herein as minimum upper flange width) of the elongate structure 102 corresponding to the minimum mass 266 of the elongate structure 102.

In some examples, the lower flange width 144 and/or the upper flange width 146 of the elongate structure 102 increase from the support structure 104 to a location along the length 114 of the elongate structure 102 that is spaced away from the support structure 104 in order to increase at least one of the mass 238 and/or the volume 276 of the elongate structure 102. In an example, the localized lower flange width 248 and/or the localized upper flange width 250 of the elongate structure 102 located away from the support structure 104 is, or defines, a maximum localized lower flange width (also referred to herein as maximum lower flange width) and/or a maximum localized upper flange width (also referred to herein as maximum upper flange width) of the elongate structure 102 corresponding to the maximum localized mass of the elongate structure 102.

Figure 2:
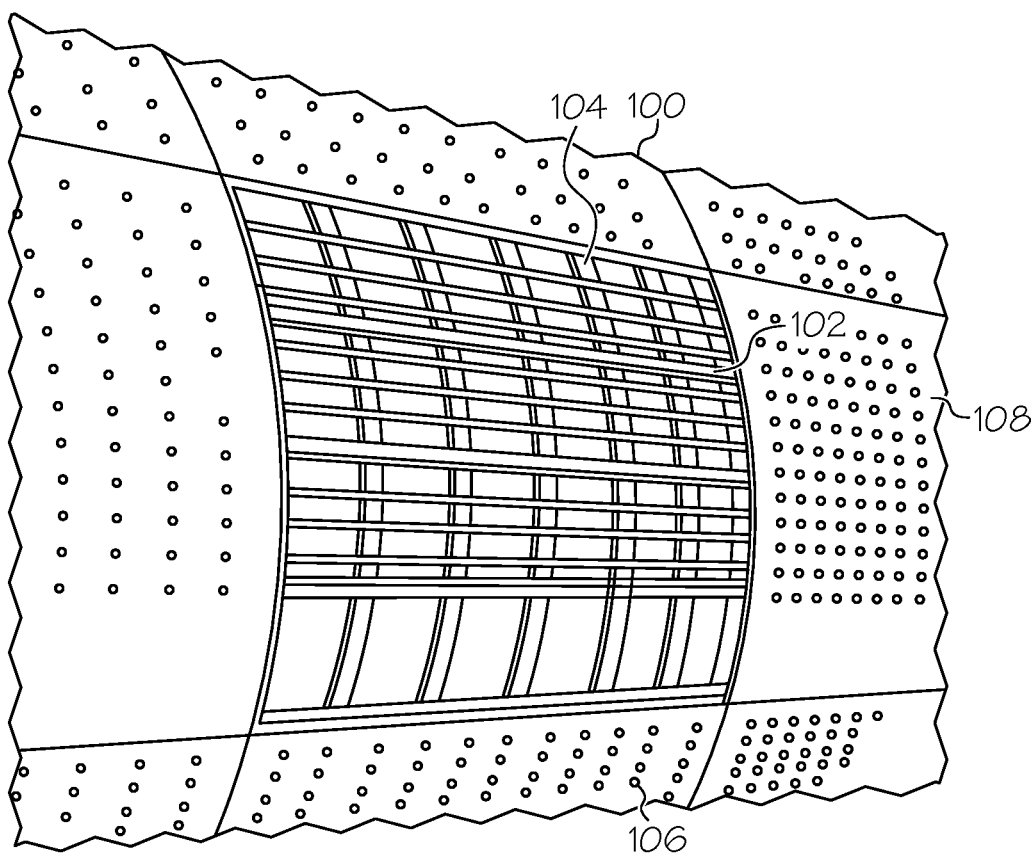
FIG. 2 is a schematic, partial, perspective view of an example of the structural assembly.
Figure 3:
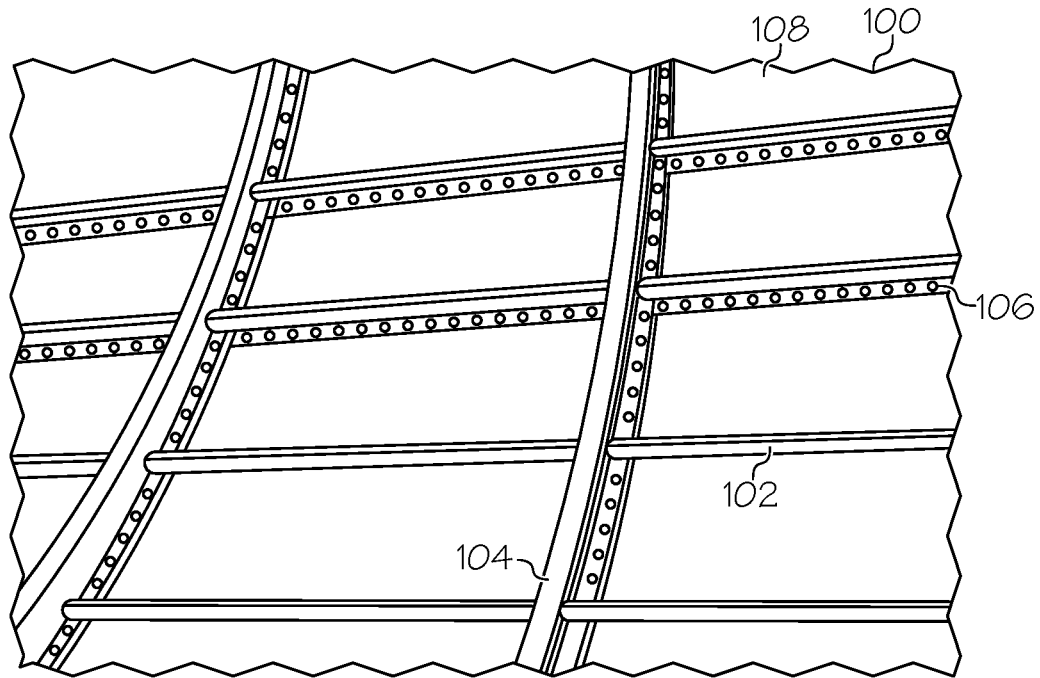
FIG. 3 is a schematic, partial, perspective view an example of the structural assembly.

FIG. 2 illustrates a portion of an example of an exterior of the structural assembly 100 and FIG. 3 illustrates a portion of an example of an interior of the structural assembly 100. The structural assembly 100 includes the plurality of elongate structures 102 (also referred to individually as elongate structure 102) and the plurality of support structures 104 (also referred to individually as support structure 104) that form a framework of the structural assembly 100. In other words, the elongate structures 102 and the support structures 104 form a skeletal-like structure of the structural assembly 100. The framework formed by the elongate structures 102 and the support structures 104 may be overlaid with an exterior material, such as the plurality of panel structures 108 (also referred to individually as panel structure 108).

In some examples, the panel structures 108 are operatively coupled with the elongate structures 102 and the support structures 104. In some examples, panel structures 108 are operatively coupled with the elongate structures 102 and the support structures 104 via an array of fasteners 106. In some examples, the elongate structures 102 are operatively coupled with the support structures 104. In some examples, the elongate structures 102 and the support structures 104 are operatively coupled together using one or more mounting clips.

The structure members forming the structural assembly 100 may be formed from a variety of materials. In some examples, the elongate structures 102, the support structures 104, and/or the panel structures 108 are fabricated from metal materials, such as aluminum, steel, or titanium. In some examples, the elongate structures 102, the support structures 104, and/or the panel structures 108 are fabricated from or non-metal materials, such as a reinforced polymer-based material having multiple layers of reinforcing fibers oriented in a predetermined orientation, such as fiber-reinforced composites.

Figure 4:
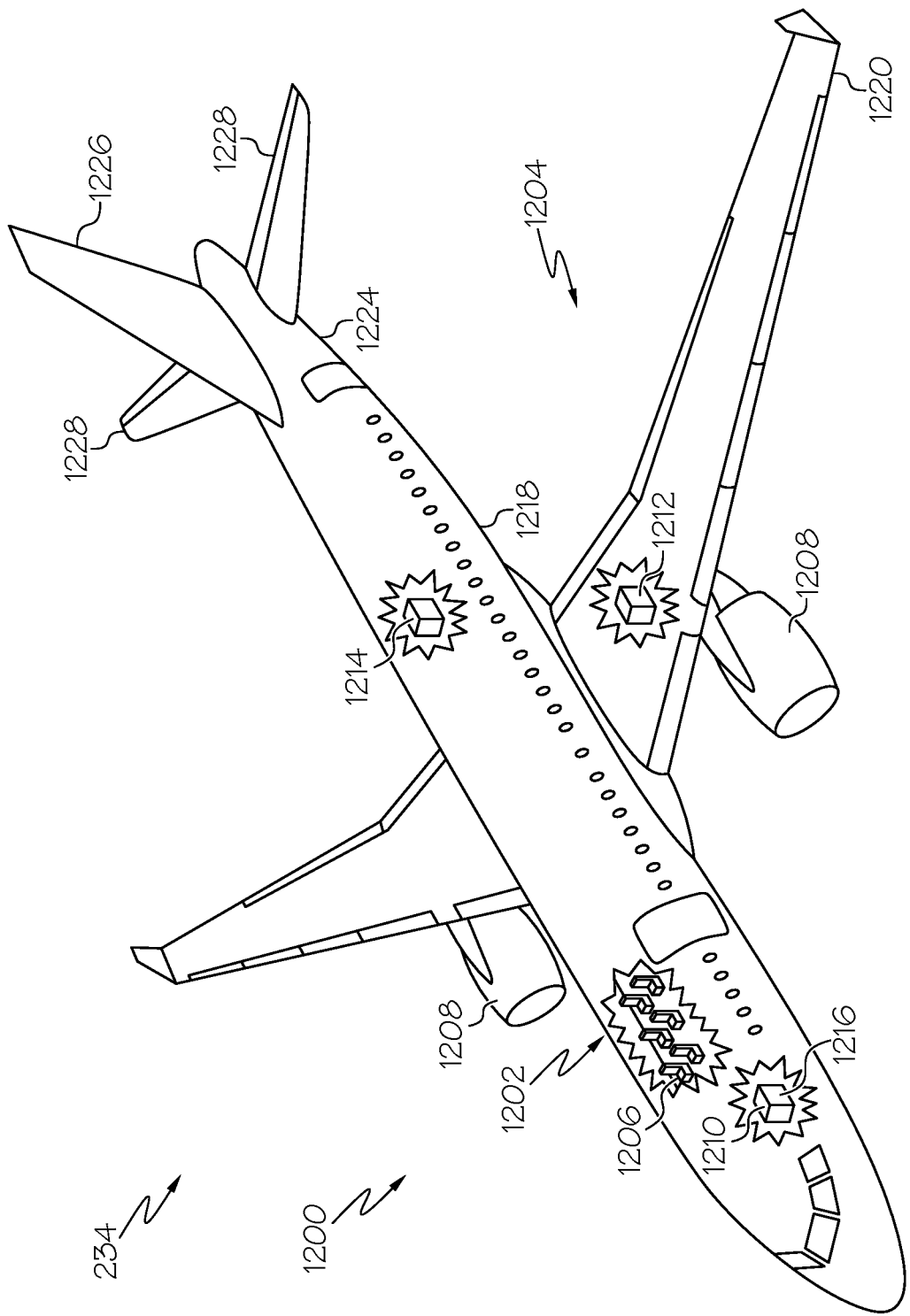
FIG. 4 is a schematic, perspective view of an example of an aircraft.

FIG. 4 illustrates an example of an aircraft 1200. The aircraft 1200 is an example of the structure 232, such as the vehicle structure 234 (FIG. 1), at least partially constructed utilizing one or more structural assemblies 100 (FIG. 1). In the illustrative example, the aircraft 1200 is a fixed-wing aircraft. The aircraft 1200 includes an airframe 1202 and a plurality of high-level systems 1204. Examples of the high-level systems 1204 include one or more of a propulsion system 1208, an electrical system 1210, a hydraulic system 1212, an environmental system 1214, and a communications system 1216. In other examples, the aircraft 1200 may include any number of other types of systems.

The aircraft 1200 includes the plurality of structural assemblies 100 (also referred to individually as structural assembly 100) that form a framework of the aircraft 1200. In other words, the elongate structures 102 and the support structures 104 form a skeletal-like structure of the airframe 1202.

In an example, the airframe 1202 includes, or forms, a fuselage 1218 of the aircraft 1200. The fuselage 1218 is the main body of the aircraft 1200 that defines an interior 1206 of the aircraft 1200, which may include a passenger compartment and/or a cargo compartment, and includes any suitable central frame structure that is configured to hold a crew, one or more passengers, and/or cargo. In the illustrative example, the fuselage 1218 is an elongate, generally cylindrical fuselage.

In an example, the fuselage 1218 includes a nose portion 1222 at a forward end of the aircraft 1200 and a tail portion 1224 at an aft end of the aircraft 1200. For the purpose of this disclosure, the terms "forward" and "aft" have their ordinary meaning as known to those skilled in the art and refer to positions relative to a direction of movement of the aircraft 1200. In some examples, the tail section 1224 also includes at least one vertical stabilizer 1226 and/or at least one horizontal stabilizer 1228.

In some examples, the structural assembly 100 (e.g., illustrated in FIGS. 2 and 3) is, or forms, a portion of the fuselage 1218 of the aircraft 1200. In these examples, the elongate structures 102 are stiffening structural members of the fuselage 1218, commonly referred to as stringers or stiffeners; the support structures 104 are main structural members of the fuselage 1218, commonly referred to as frames or formers; and the panel structures 10 are an exterior skin of the fuselage 1218, commonly referred to as skin panels. The elongate structures 102 are oriented generally parallel to each other and extend generally parallel to a longitudinal axis of the fuselage 1218. The support structures 104 include annular hoops that extend circumferentially around the longitudinal axis of the fuselage 1218 and that are spaced along the longitudinal axis of the fuselage 1218.

The airframe 1202 also includes, or forms, a pair of wings 1220 (also referred to individually as wing 1220). Each one of the wings 1220 is coupled to the fuselage 1218. Each wing 1220 includes any suitable airfoil structure that is configured to provide lift to the aircraft 1200. In the illustrative example, the wings 1220 are elongate structures extending from a lower portion of the fuselage 1218 in a swept wing, tapered planform. In other examples, the wings 1220 are straight or delta-shaped. In still other examples, the wings 1220 are trapezoidal, constant, elliptical, semi-elliptical, or other configurations known in the art.

In some examples, the structural assembly 100 (e.g., illustrated in FIGS. 2 and 3) is, or forms, a portion of the wing 1220 of the aircraft 1200. In these examples, the elongate structures 102 are stiffening structural members of the wing 1220, commonly referred to as stringers or stiffeners; the support structures 104 are structural members of the wing 1220, commonly referred to as ribs; and the panel structures 10 are an exterior skin of the wing 1220, commonly referred to as skin panels. The elongate structures 102 are oriented generally parallel to each other and extend generally parallel to a spanwise axis of the wing 1220. The support structures 104 are oriented generally parallel to each other, extend generally parallel to a chordwise axis of the wing 1220, and are spaced along the spanwise axis of the wing 1220.

Generally, the aircraft 1200 includes various structural members that form the airframe 1202, the fuselage 1218, the wings 1220, the vertical stabilizer 1226, the horizontal stabilizer 1228, and other structures of the aircraft 1200. Examples of such structural members include formers, ribs, stringers, spars, longerons, skin panels, and other types of parts. These structural members are coupled together by any one of various methods including, but not limited to, connection by various kinds of fasteners, co-curing, structurally bonding (e.g., adhesively bonding), or integrally forming.

Figure 5:
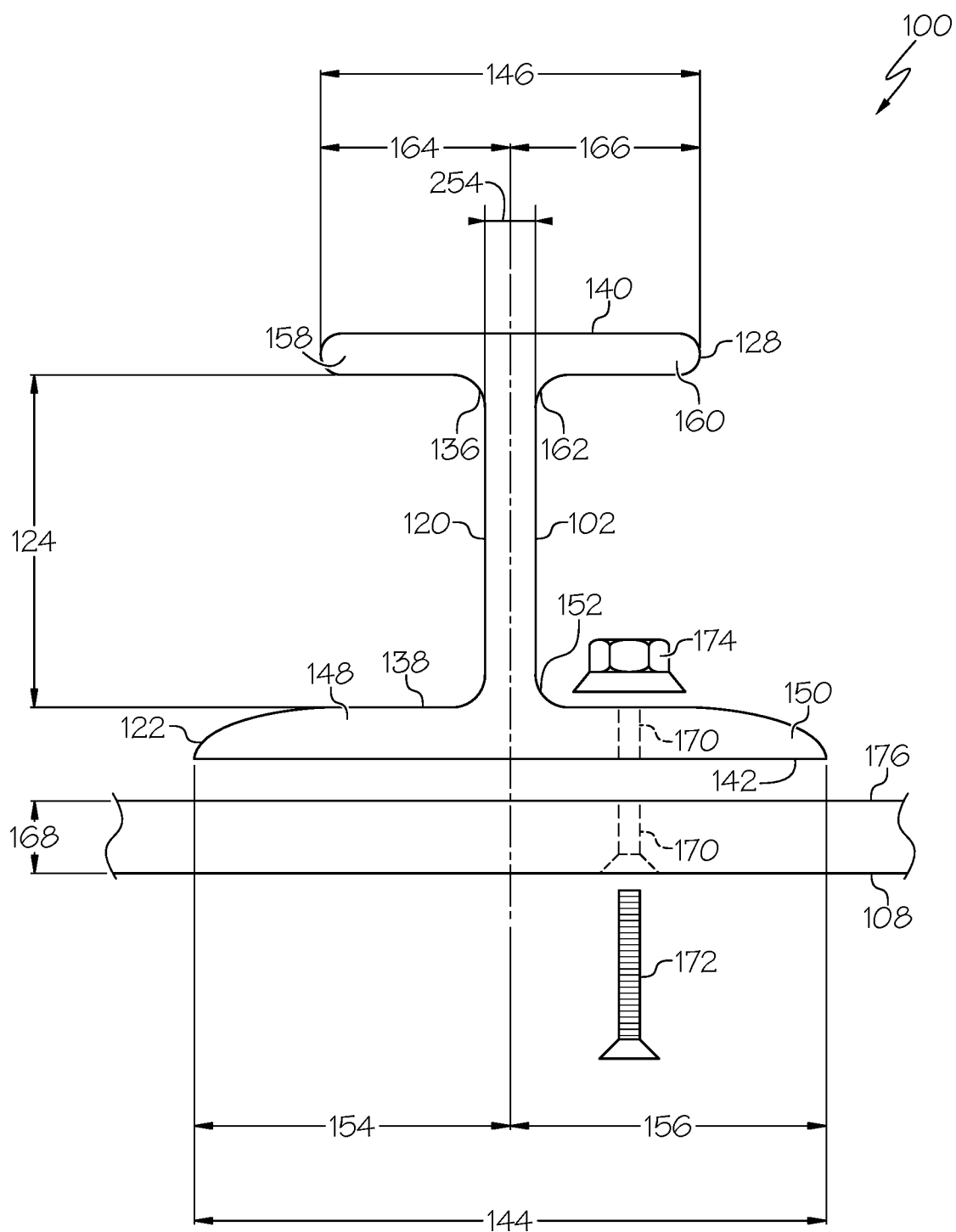
FIG. 5 is a schematic, exploded, partial, sectional view of an example of the structural assembly.

In yet other examples, the structural assembly 100 (e.g., illustrated in FIGS. 2 and 3) is, or forms, a portion of another type of vehicle structure 234 or stand-alone structure 236. In an example, the elongate structures 102 are any structural component or member that extends between, that intersects, and/or that is joined to the support structures 104 of the structural assembly 100. FIG. 5 illustrates a portion of an example of the disclosed structural assembly 100 including the elongate structure 102 and a portion of the panel structure 108. In an example, the elongate structure 102 includes the lower flange 122 (also referred to as a first flange, a base flange, or a bottom flange), the web 120, and the upper flange 128 (also referred to as a second flange, an end flange, or a top flange).

The web 120 is positioned between the lower flange 122 and the upper flange 128. The upper flange 128 opposes the lower flange 122. The web 120 extends a length 114 (FIG. 1) of the elongate structure 102. The web 120 has the web height 124. In some circumstances, the web height 124 may also be commonly referred to as a web depth. The web height 124 extends between, or is defined by a distance between, an upper flange bottom surface 136 of the upper flange 128 and a lower flange top surface 138 of the lower flange 122. The web height 124 may be geometrically configured, or "designed," in order to provide a desired resistance to an applied loading to the structural assembly 100.

In some examples, the web height 124 of the web 120 is variable (e.g., includes a variable height) along the length 114 (FIG. 1) of the elongate structure 102. In other words, the web height 124 varies throughout one or more portions of the length 114 of the elongate structure 102. In some examples, the web height 124 varies continuously along the length 114 of the elongate structure 102. In some examples, the web height 124 has both constant height portions along certain lengths of the elongate structure 102 and variable height portions along different lengths of the same elongate structure 102.

In some examples, the web height 124 of the web 120 is, or defines, the minimum web height 132 at one or more locations along the length 114 of the elongate structure 102 corresponding to the minimum height 116 of the elongate structure 102. The web height 124 of the web 120 is, or defines, the maximum web height 134 at one or more locations along the length 114 of the elongate structure 102 corresponding to the maximum height 118 of the elongate structure 102.

In some examples, the minimum web height 132 corresponds to the minimum mass 266 of the elongate structure

102. In some examples, the minimum web height 132 corresponds to the minimum volume 278 of the elongate structure 102.

In some examples, the maximum web height 134 corresponds to the minimum mass 266 of the elongate structure 102, for example, by correspondingly decreasing the width 244 of the elongate structure 102 and/or the web thickness 254 of the web 120. In some examples, the maximum web height 134 corresponds to the minimum volume 280 of the elongate structure 102, for example, by correspondingly decreasing the width 244 of the elongate structure 102 and/or the web thickness 254 of the web 120.

In some examples, the maximum web height 134 corresponds to the maximum mass 268 of the elongate structure 102. In some examples, the maximum web height 134 corresponds to the maximum volume 280 of the elongate structure 102.

In some examples, the minimum web height 132 corresponds to the maximum mass 268 of the elongate structure 102, for example, by correspondingly increasing the width 244 of the elongate structure 102 an/or the web thickness 254 of the web. In some examples, the minimum web height 132 corresponds to the maximum volume 280 of the elongate structure 102, for example, by correspondingly increasing the width 244 of the elongate structure 102 an/or the web thickness 254 of the web.

In some examples, the web thickness 254 of the web 120 is variable (e.g., includes a variable thickness) along the length 114 (FIG. 1) of the elongate structure 102. In other words, the web thickness 254 varies throughout one or more portions of the length 114 of the elongate structure 102. In some examples, the web thickness 254 varies continuously along the length 114 of the elongate structure 102. In some examples, the web thickness 254 has both constant height portions along certain lengths of the elongate structure 102 and variable height portions along different lengths of the same elongate structure 102.

In some examples, the web thickness 254 of the web 120 is, or defines, the minimum web thickness 270 at one or more locations along the length 114 of the elongate structure 102. The web thickness 254 of the web is, or defines, the maximum web thickness 272 at one or more other locations along the length 114 of the elongate structure 102.

In some examples, the minimum web thickness 270 corresponds to the minimum height 116 of the elongate structure 102. In some examples, the minimum web thickness 270 corresponds to the minimum web height 132 of the web 120.

In some examples, the minimum web thickness 270 corresponds to the maximum height 118 of the elongate structure 102. In some examples, the minimum web thickness 270 corresponds to the maximum web height 134 of the web 120.

In some examples, the maximum web thickness 272 corresponds to the minimum height 116 of the elongate structure 102. In some examples, the maximum web thickness 272 corresponds to the minimum web height 132 of the web 120.

In some examples, the maximum web thickness 272 corresponds to the maximum height 118 of the elongate structure 102. In some examples, the maximum web thickness 272 corresponds to the maximum web height 134 of the web 120.

In some examples, the minimum web thickness 270 corresponds to the minimum mass 266 of the elongate structure 102. In some examples, the minimum web thickness 270 corresponds to the minimum volume 274 of the elongate structure 102.

In some examples, the maximum web thickness 272 corresponds to the minimum mass 266 of the elongate structure 102, for example, by correspondingly decreasing the width 244 of the elongate structure 102 and/or the web height 124 of the web 120. In some examples, the maximum web thickness 272 corresponds to the minimum volume 278 of the elongate structure 102, for example, by correspondingly decreasing the width 244 of the elongate structure 102 and/or the web height 124 of the web 120.

In some examples, the maximum web thickness 272 corresponds to the maximum mass 268 of the elongate structure 102. In some examples, the maximum web thickness 272 corresponds to the maximum volume 274 of the elongate structure 102.

In some examples, the minimum web thickness 270 corresponds to the maximum mass 238 of the elongate structure 102, for example, by correspondingly increasing the width 244 of the elongate structure 102 and/or the web height 124 of the web 120. In some examples, the minimum web thickness 270 corresponds to the maximum volume 280 of the elongate structure 102, for example, by correspondingly increasing the width 244 of the elongate structure 102 and/or the web height 124 of the web 120.

In an example, the lower flange 122 and the upper flange 128 include generally planar members. In an example, an upper flange top surface 140 is generally planar. Similarly, in an example, a lower flange bottom surface 142 is generally planar. Alternatively, in other examples, one or both of the upper flange top surface 140 and/or the lower flange bottom surface 142 may be non-planar.

In some examples, a flange portion of the lower flange 122 and/or the upper flange 128 may be positioned on one or both of the longitudinal edges of the web 120 in order to provide resistance to localized failure of the web 120 due to lateral buckling. The flange portion, for example, of the lower flange 122, further enables the elongate structure 102 to be coupled to the panel structure 108 and/or support structure 104 by providing an attachment surface for the panel structure 108 and/or the support structure 104. The elongate structure 102 may also help carry and/or transfer loads. For example, the elongate structure 102 may transfer a load from a panel structure 108 to another structure, such as the support structure 104.

The lower flange 122 has a lower flange width 144 and the upper flange 128 has an upper flange width 146 along a span, or the length 114 of the elongate structure 102 (i.e., into the page of FIG. 5). In some examples, one or both of the lower flange width 144 and/or the upper flange width 146 is constant (e.g., includes a constant width) along the length 114 of the elongate structure 102. In some examples, one or both of the lower flange width 144 and/or the upper flange width 146 is variable (e.g., includes a variable width) along the length 114 of the elongate structure 102. In other words, one or both of the lower flange width 144 and/or the upper flange width 146 varies throughout one or more portions of the length 114 of the elongate structure 102. In some examples, one or both of the lower flange width 144 and/or the upper flange width 146 varies continuously along the length 114 of the elongate structure 102. In some examples, one or both of the lower flange width 144 and/or the upper flange width 146 has both constant width portions along certain lengths of the elongate structure 102 and variable width portions along different lengths of the same elongate structure 102.

In some examples, as illustrated, the upper flange width 146 is relatively narrow compared to (e.g., is relatively smaller than) an overall height, i.e., the height 110, of the elongate structure 102 or the web height 124 of the web 120. In some examples, as illustrated, the upper flange width 146 is relatively narrow compared to (e.g., is relatively smaller than) the lower flange width 144. However, in other examples, alternative relative widths may be used.

In some examples, the lower flange width 144 may be a function of the loading experienced by the structural assembly 100 or the loading experienced by at least one portion of the elongate structure 102, such as between the panel structure 108 and the lower flange 122, such as between the panel structure 108 and one of the lower flange portions. In some examples, the upper flange width 146 may be a function of the loading experienced by the structural assembly 100 or the loading experienced by at least one portion of the elongate structure 102, such as one of the upper flange portions.

In an example, as illustrated in FIG. 5, the lower flange 122 includes a first lower flange portion 148 and a second lower flange portion 150. Both the first lower flange portion 148 and the second lower flange portion 150 extend away from a lower area 152 (e.g., the base) of the web 120. In an example, the first lower flange portion 148 and the second lower flange portion 150 extend laterally outward on both sides of the web 120.

In an example, the first lower flange portion 148 has a first lower flange portion width 154 and the second lower flange portion 150 has a second lower flange portion width 156. Generally, the first lower flange portion width 154 and the second lower flange portion width 156, in combination, define the lower flange width 144.

In some examples, as illustrated, both the first lower flange portion 148 and the second lower flange portion 150 extend laterally along a common plane. In some other examples, alternative, non-planar lower flange portion configurations may also be used. In some examples, the elongate structure 102 includes more that two lower flange portions.

In some examples, the first lower flange portion width 154 and the second lower flange portion width 156 are generally, or approximately, equivalent. Alternatively, in some examples, the first lower flange portion width 154 and second lower flange portion width 156 are not equivalent or are different along certain portions of the length 114 of the elongate structure 102.

In some examples, the first lower flange portion width 154 is variable (e.g., includes a variable width) along at least a portion of the length 114 of the elongate structure 102 while the opposing second lower flange portion width 156 is constant (e.g., includes a constant width) along at least a portion of the length 114 of the elongate structure or vise versa. In some examples, both the first lower flange portion width 154 and the second lower flange portion width 156 are variable (e.g., includes a variable width) along at least a portion of the length 114 of the elongate structure 102.

In some examples, the lower flange 122 of the elongate structure 102 includes only a single lower flange portion, such as only the first lower flange portion 148 or only the second lower flange portion 150. In some examples of the elongate structure 102 including the lower flange 122 that includes only one lower flange portion (e.g., such as the first lower flange portion 148), such a single lower flange portion may have a constant width. For example, such a single lower flange portion may have a constant width over the entire length 114 of the elongate structure 102. In some examples of the elongate structure 102 including the lower flange 122 that includes only one lower flange portion (e.g., such as the first lower flange portion 148), such a single lower flange portion may have a variable width. For example, such a single lower flange portion may have a variable width along at least one portion of the length 114 of the elongate structure 102 or over the entire length 114 of the elongate structure 102.

In some examples, the lower flange 122 of the elongate structure 102 includes the first lower flange portion 148 along a certain portion of the length 114 of the elongate structure 102 and includes the second lower flange portion 150 along another certain portion of the length 114 of the elongate structure 102. In other words, the elongate structure 102 includes at least one section of the first lower flange portion 148 and at least one section of the second lower flange portion 150. In an example of such an arrangement, a section of the first lower flange portion 148 and a section of the second lower flange portion 150 reside, or are located, adjacent to each other.

In some examples, as illustrated in FIG. 5, both the first lower flange portion 148 and the second lower flange portion 150 are generally symmetrical about the web 120 in that they have a generally similar geometry. Alternatively, in other examples, the first lower flange portion 148 and the second lower flange portion 150 are non-symmetrical about the web 120. In some examples, one or both of the first lower flange portion 148 and the second lower flange portion 150 include a variable shape extending along at least a portion of the length 114 of the elongate structure 102. Such a variable shaped lower flange portions may include curved, stepped, ramped, or other like flange configurations. Alternatively, in some examples, both the first lower flange portion 148 and the second lower flange portion 150 include just one shape along the entire length 114 of the elongate structure 102.

For the purpose of this disclosure and as illustrated, the lower flange 122 defines a bottom or base of the elongate structure 102 or is referred to as an inner flange that is located proximate to (e.g., at or near) the panel structure 108. The lower flange bottom surface 142 defines an outer longitudinal surface of the elongate structure 102. This outer longitudinal surface is configured to abut a mounting surface 176 (e.g., an inner or upper surface or inner mold line) of the panel structure 108 of the structural assembly 100.

In an example, as illustrated in FIG. 5, the upper flange 128 includes a first upper flange portion 158 and a second upper flange portion 160. Both the first upper flange portion 158 and the second upper flange portion 160 extend away from an upper area 162 (e.g., a free distal end) of the web 120. In an example, the first upper flange portion 158 and the second upper flange portion 160 extend laterally outward on both sides of the web 120.

In an example, the first upper flange portion 158 has a first upper flange portion width 164 and the second upper flange portion 160 has a second upper flange portion width 166. Generally, the first upper flange portion width 164 and the second upper flange portion width 166, in combination, define the upper flange width 146.

In some examples, as illustrated, both the first upper flange portion 158 and the second upper flange portion 160 extend laterally along a common plane. In some other examples, alternative, non-planar upper flange portion configurations may also be used. In some examples, the elongate structure 102 includes more that two upper flange portions.

In some examples, the first upper flange portion width 164 and the second upper flange portion width 166 are generally, or approximately, equivalent. Alternatively, in some examples, the first upper flange portion width 164 and second upper flange portion width 166 are not equivalent or are different along certain portions of the length 114 of the elongate structure 102.

In some examples, the first upper flange portion width 164 is variable (e.g., includes a variable width) along at least a portion of the length 114 of the elongate structure 102 while the opposing second upper flange portion width 166 is constant (e.g., includes a constant width) along at least a portion of the length 114 of the elongate structure or vise versa. In some examples, both the first upper flange portion width 164 and the second upper flange portion width 166 are variable (e.g., includes a variable width) along at least a portion of the length 114 of the elongate structure 102.

In some examples, the upper flange 128 of the elongate structure 102 includes only a single upper flange portion, such as only the first upper flange portion 158 or only the second upper flange portion 160. In some examples of the elongate structure 102 including the upper flange 128 that includes only one upper flange portion (e.g., such as the first upper flange portion 158), such a single upper flange portion may have a constant width. For example, such a single lower flange portion may have a constant width over the entire length 114 of the elongate structure 102. In some examples of the elongate structure 102 including the upper flange 128 that includes only one upper flange portion (e.g., such as the first upper flange portion 158), such a single upper flange portion may have a variable width. For example, such a single upper flange portion may have a variable width along at least one portion of the length 114 of the elongate structure 102 or over the entire length 114 of the elongate structure 102.

In some examples, the upper flange 128 of the elongate structure 102 includes the first upper flange portion 158 along a certain portion of the length 114 of the elongate structure 102 and includes the second upper flange portion 160 along another certain portion of the length 114 of the elongate structure 102. In other words, the elongate structure 102 includes at least one section of the first upper flange portion 158 and at least one section of the second upper flange portion 160. In an example of such an arrangement, a section of the first upper flange portion 158 and a section of the second upper flange portion 160 reside, or are located, adjacent to each other.

In some examples, as illustrated in FIG. 5, both the first upper flange portion 158 and the second upper flange portion 160 are generally symmetrical about the web 120 in that they have a generally similar geometry. Alternatively, in other examples, the first upper flange portion 158 and the second upper flange portion 160 are non-symmetrical about the web 120. In some examples, one or both of the first upper flange portion 158 and the second upper flange portion 160 include a variable shape extending along at least a portion of the length 114 of the elongate structure 102. Such a variable shaped upper flange portions may include curved, stepped, ramped, or other like flange configurations. Alternatively, in some examples, both the first upper flange portion 158 and the second upper flange portion 160 include just one shape along the entire length 114 of the elongate structure 102.

For the purpose of this disclosure and as illustrated, the upper flange 128 defines a top or free distal end of the elongate structure 102 or is referred to as an outer flange that is located away from the panel structure 108.

In some examples, the elongate structure 102 is (e.g., is formed by) a monolithic structure. In some examples, such a monolithic structure is fabricated from a metallic material.

In some examples, such a monolithic, metallic structure may be fabricated via an extrusion, rolling, and/or forging process to form a desired, shape, geometry, and/or configuration of the elongate structure 102 (e.g., of the lower flange 122, the web 120, and/or the upper flange 128). Additionally, in some examples, portions of such a monolithic, metallic structure are fabricated via a machining operation to achieve the desired, shape, geometry, and/or configuration of the elongate structure 102. In an example, portions of the web 120, the lower flange 122, and/or the upper flange 128 may be machined to have a generally planar surface that may be used as a mounting surface for the elongate structure 102. In an example, portions of the web 120, the lower flange 122, and/or the upper flange 128 may be machined to achieve the variable web height and/or the variable flange widths, respectively.

In some examples, such a monolithic, metallic structure may be fabricated via an additive manufacturing process to form a desired shape, geometry, and/or configuration of the elongate structure 102 (e.g., of the lower flange 122, the web 120, and/or the upper flange 128). For the purpose of this disclosure, the term "additive manufacturing" refers to any available technology that builds three-dimensional objected by adding layer-upon-layer of material and that utilizes, for example, a computer, three-dimensional modeling software (e.g., computer aided design), machine equipment, and a layering material (e.g., metal, plastic, or the like). Examples of additive manufacturing include, but are not limited to, Selective Laser Sintering (SLS), Direct Metal Laser Sintering (DMLS), and Selective Laser Melting (SLM). Advantageously, an additive manufacturing process may be used to achieve the desired, shape, geometry, and/or configuration of the elongate structure 102 while reducing the complexity of the fabrication process and the amount of waste material. In an example, additive manufacturing may enable portions of the web 120, the lower flange 122, and/or the upper flange 128 to be formed in situ (i.e., built up) having a generally planar surface that may be used as a mounting surface for the elongate structure 102. In an example, additive manufacturing may enable portions of the web 120, the lower flange 122, and/or the upper flange 128 to be formed in situ having the variable web height and/or the variable flange widths, respectively.

In some examples, the monolithic structure is fabricated from a reinforced polymer composite material. Such a monolithic, composite structure may be fabricated via any one of various known composite manufacturing techniques to form a desired shape, geometry, and/or configuration of the elongate structure 102 (e.g., of the lower flange 122, the web 120, and/or the upper flange 128). In an example, layers of a reinforced polymer composite material, such as in the form of woven or non-woven sheets or unidirectional tape impregnated with a resin matrix, may be laid up on a forming tool, such as a mandrel or mold, having a desired, shape, geometry, and/or configuration of the elongate structure 102 and cured.

In an example, the panel structure 108 has a panel thickness 168. Like the elongate structure 102, the panel structure 108 may be fabricated from any one of a variety of materials, such as a metallic material or a reinforced polymer composite material. Depending upon the material compositions of the panel structure 108 and the elongate structure 102, the panel structure 108 is coupled to the lower flange 122 of the elongate structure 102 in any one of a variety of techniques.

In some examples, such as where the panel structure 108 and the elongate structure 102 are both formed of a composite material, the panel structure 108 is coupled to the lower flange 122 using a suitable adhesive material. In some examples, the elongate structure 102 and the panel structure 108 may reside in a relatively uncured state. In some examples, the elongate structure 102 and the panel structure 108 may reside in a relatively cured state. In one particular example, the panel structure 108 may be coupled to the lower flange 122 by interposing a film adhesive material between a relatively uncured panel structure 108 and the lower flange 122 of a relatively cured elongate structure 102. The film adhesive is then cured while the uncured panel structure 108 is cured, thereby forming an adhesive bond between the lower flange 122 and the panel structure 108. Alternately, in another particular example, the film adhesive may be interposed between a relatively cured panel structure 108 and a relatively uncured elongate structure 102, so that the adhesive bond is formed while the elongate structure 102 is being cured.

In some examples, such as where one or both the panel structure 108 and the elongate structure 102 are formed of a composite material and/or a metallic material, the panel structure 108 and the lower flange 122 may include a least one aperture 170 that projects through the panel structure 108 and at least one of the lower flange portions of the lower flange 122. The aperture 170 is suitably sized to accommodate a threaded shaft portion 172 (e.g., a bolt) of the fastener 106 that threadably engages a nut portion 174 of the fastener 106 that cooperatively couples the panel structure 108 and the lower flange 122. The fastener 106 (i.e., the threaded shaft portion 172 and the nut portion 174) cooperatively imparts a predetermined compressive force to the panel structure 108 and the lower flange 122 when a predetermined torque is imparted to the fastener 106. Such fastening systems develop a predetermined tension by including a shear portion that breaks during installation when the predetermined tension is achieved.

In some examples, the elongate structure 102 includes the lower flange 122 having both the first lower flange portion 148 and the second lower flange portion 150 and the upper flange 128 having both the first upper flange portion 158 and the second upper flange portion 160. Such a flange arrangement is commonly referred to as taking the form of an "I" beam structure.

In some examples, the elongate structure 102 includes the lower flange 122 having only the first lower flange portion 148 and, optionally, the upper flange 128 having one or both of the first upper flange portion 158 and/or the second upper flange portion 160. Such a flange arrangement is commonly referred to as taking the form of a "J" beam structure.

In some examples, the elongate structure 102 includes the lower flange 122 having only the second lower flange portion 150 and, optionally, the upper flange 128 having one or both of the first upper flange portion 158 and/or the second upper flange portion 160. Such a flange arrangement is commonly referred to as taking the form of an "L" beam structure.

In some examples, the elongate structure 102 includes the lower flange 122 having only the first lower flange portion 148 (or only the second lower flange portion 150) and the upper flange 128 having only the first upper flange portion 158 (or only the second upper flange portion 16). Such a flange arrangement is commonly referred to as taking the form of a "C" beam structure (or an inverted "C" beam structure).

In some examples, the elongate structure 102 includes the lower flange 122 having only the second lower flange portion 150 (or only the first lower flange portion 148) and the upper flange 128 having only the first upper flange portion 158 (or only the second upper flange portion 160). Such a flange arrangement is commonly referred to as taking the form of a "Z" beam structure (or an inverted "Z" beam structure).

In some examples, the elongate structure 102 includes only the lower flange 122 having one or both the first lower flange portion 148 and/or the second lower flange portion 150 or includes only the web 120, coupled directly to the panel structure 108. Such an arrangement is commonly referred to as taking the form of a blade structure (e.g., a blade stringer).

In some examples, the elongate structure 102 may include other shapes and/or geometries forming different open or closed configurations. For examples, the elongate structure 102 may include any one of various other beam structures or hat-type structures (e.g., a hat stringer).

Figure 6:
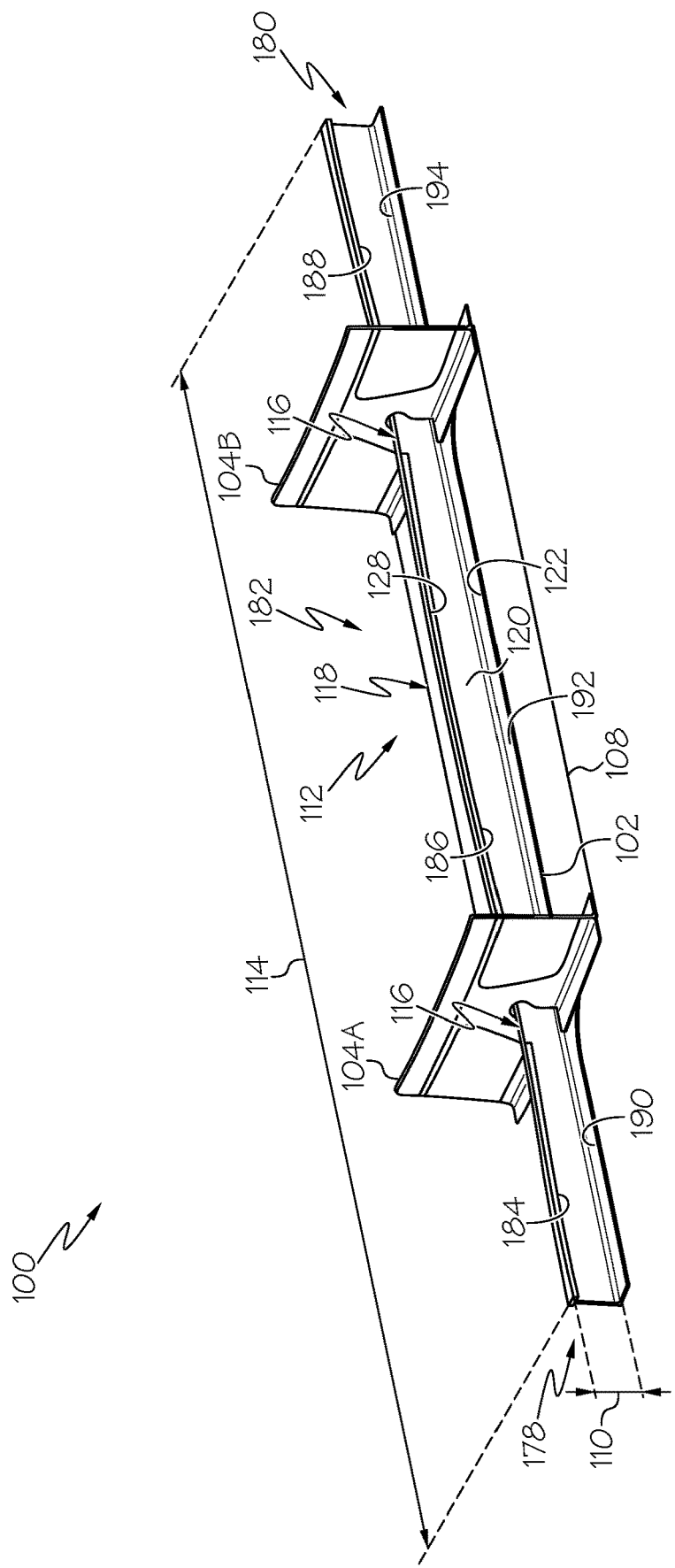
FIG. 6 is a schematic, partial, perspective view of an example of the structural assembly.
Figure 7:
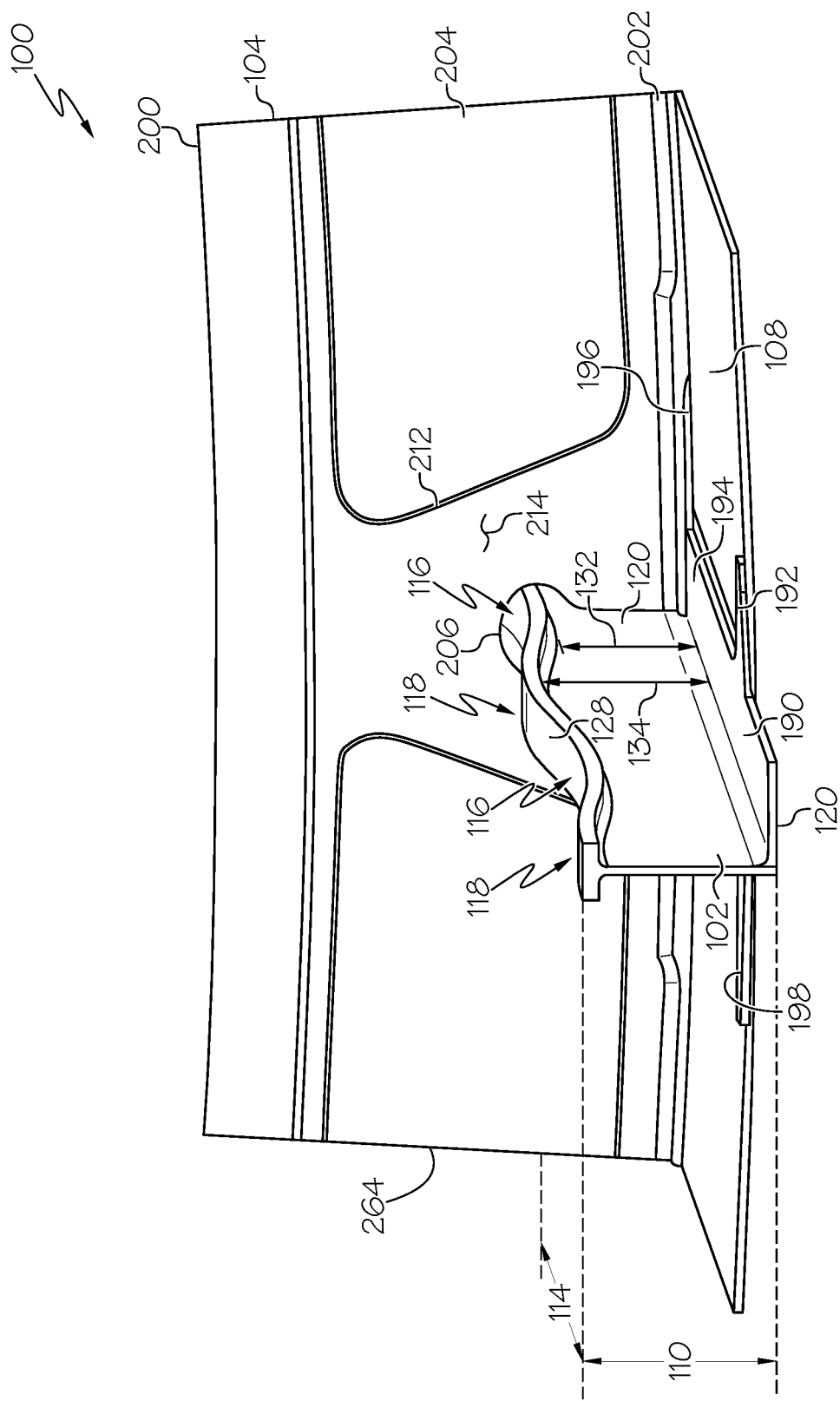
FIG. 7 is a schematic, partial, perspective view of an example of the structural assembly.
Figure 8:
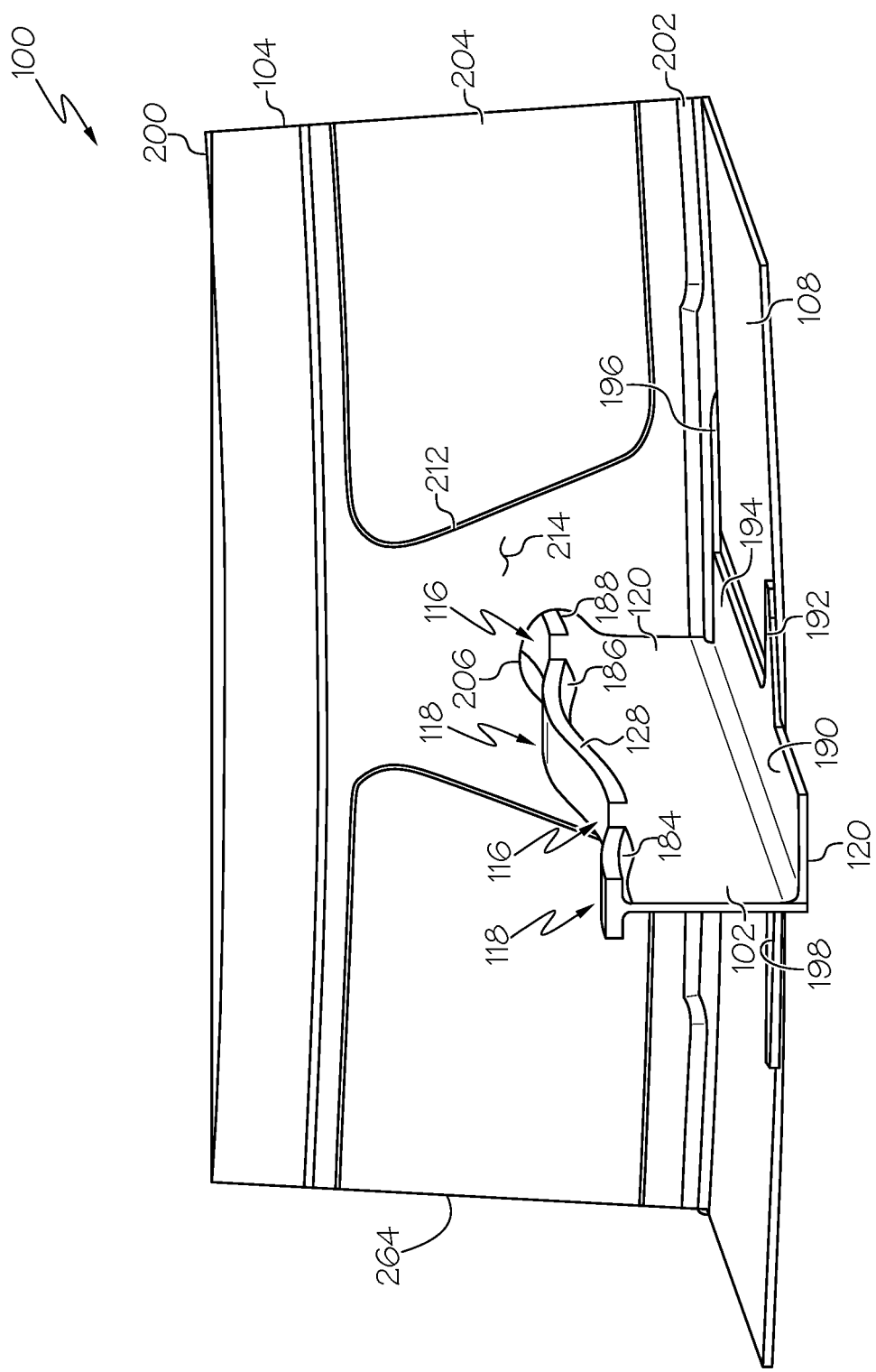
FIG. 8 is a schematic, partial, perspective view of an example of the structural assembly.
Figure 9:
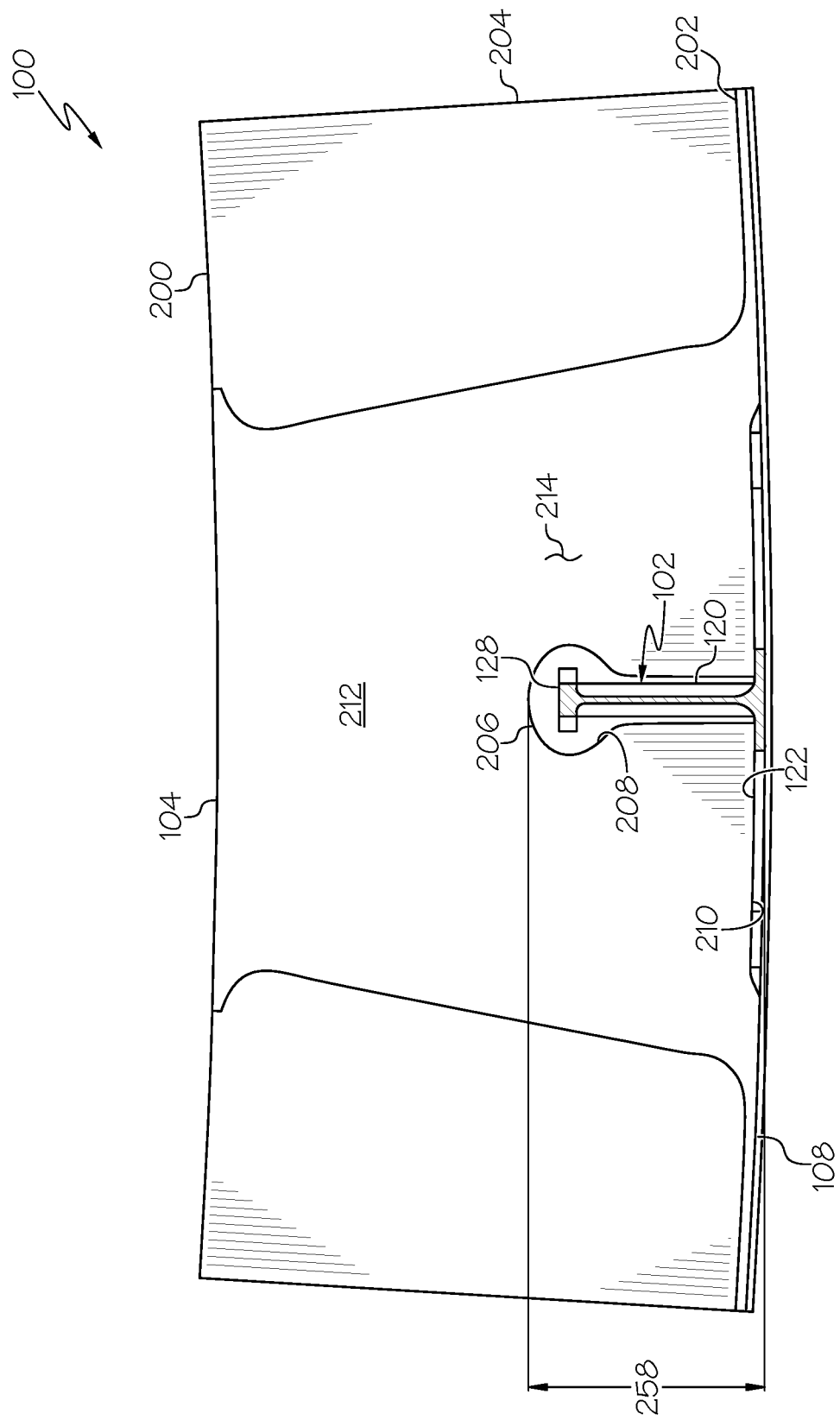
FIG. 9 is a schematic, partial, sectional view of an example of the structural assembly.

FIG. 6 illustrates a portion of an example of the disclosed structural assembly 100 including the elongate structure 102, a portion of the panel structure 108, and a portion of an opposed pair of support structures 104 (referred to individually as a first support structure 104A and a second support structure 104B). FIG. 7 illustrates a portion of an example of the disclosed structural assembly 100 including a portion of the elongate structure 102, a portion of the panel structure 108, and a portion of the support structure 104. FIG. 8 illustrates a portion of an example of the disclosed structural assembly 100 including a portion of the elongate structure 102, a portion of the panel structure 108, and a portion of the support structure 104. FIG. 9 illustrates a section of a portion of an example of the disclosed structural assembly 100 including the elongate structure 102, having a cross-section taken proximate to (e.g., at or near the support structure 104), a portion of the panel structure 108, and a portion of the support structure 104.

Referring to FIGS. 6 and 7, the elongate structure 102 has the height 110. Generally, as illustrated in FIG. 5, the height 110 of the elongate structure 102 is defined by the web height 124 of the web 120 in combination with a lower flange thickness of the lower flange 122 (i.e., extending between the lower flange bottom surface 142 and the lower flange top surface 138) and/or an upper flange thickness of the upper flange 128 (i.e., extending between the upper flange bottom surface 136 and the upper flange top surface 140).

The height 110 of the elongate structure 102 is variable (e.g., includes a variable height) along its length 114. In other words, the height 110 varies throughout one or more portions of the length 114 of the elongate structure 102. In some examples, the height 110 varies continuously along the length 114 of the elongate structure 102. In some examples, the height 110 has both constant height portions along certain lengths of the elongate structure 102 and variable height portions along different lengths of the same elongate structure 102.

In some examples, the length 114 of the elongate structure 102 is defined from a first end 178 of the elongate structure 102 to a second end 180 of the elongate structure 102, opposite the first end 178. In some examples, a certain dimension of the elongate structure 102 located, inclusively, between the first end 178 and the second end 180 defines the length 114 of the elongate structure 102. In some examples, the length 114 of the elongate structure 102 is defined from one of the ends (e.g., the first end 178 or the second end 180) to one of the support structures 104 (e.g., the first support structure 104A or the second support structure 104B). In some examples, the length 114 of the elongate structure 102 is defined between an adjacent, opposite pair of the support structures 104 (e.g., between the first support structure 104A and the second support structure 104B). In some examples, an area or region located between the adjacent, opposite pair of the support structures 104 (e.g., between the first support structure 104A and the second support structure 104B) is referred to as a bay 182 of the structural assembly 100.

Generally, in the examples illustrated in FIGS. 6-9, the elongate structure 102 includes the web 120, the lower flange 122, and the upper flange 128 each having localized cross-sectional shapes and localized geometries that define the localized masses 240 and/or localized volumes 276 that vary along at least a portion of the length 114 of the elongate structure 102.

In some examples of the elongate structure 102, as illustrated in FIGS. 6-8, the lower flange 120 has a variable or non-uniform cross-section along at least a portion of the length 114 of the elongate structure 102. In an example, the elongate structure 102 includes the lower flange 122 extending along a portion (e.g., only certain portions) of the length 114 of the elongate structure 102 and the lower flange width 144 (FIG. 5) is variable along at least a portion of the length 114 of the elongate structure 102. In an example, the lower flange 122 includes one or both of the first lower flange portion 148 and/or the second lower flange portion 150 extending along a portion of the length 114 of the elongate structure 102 and the first lower flange portion width 154 (FIG. 5) and/or the second lower flange portion width 156 (FIG. 5) are variable along at least a portion of the length 114 of the elongate structure. For example, the first lower flange portion width 154 and/or the second lower flange portion width 156 may vary continuously along the length 114 of the elongate structure 102 or may include varying sections and constant sections along different portions of the length 114 of the elongate structure 102.

In some examples, as illustrated in FIGS. 6-8, the lower flange 122 (the first lower flange portion 148 or the second lower flange portion 150) includes a plurality of lower flange sections, such as a first lower flange section 190, a second lower flange section 192, a third lower flange section 194, a fourth lower flange section 196, a fifth lower flange section 198, etc. In some examples, the lower flange width 144 (the first lower flange portion width 154 and/or the second lower flange portion width 156) is, or defines, a minimum width along certain portions of the length 114 of the elongate structure 102, for example, between adjacent ones of the lower flange sections. In some examples, the lower flange width 144 (the first lower flange portion width 154 and/or the second lower flange portion width 156) is, or defines, a maximum width along certain other portions of the length 114 of the elongate structure 102, for example, along the lower flange sections.

In some examples, a lower flange width each of one of the lower flange sections (e.g., the first lower flange section 190, the second lower flange section 192, the third lower flange section 194, the fourth lower flange section 196, and the fifth lower flange section 198) is generally or approximately equivalent. In some examples, a lower flange width of at least one of the lower flange sections (e.g., the first lower flange section 190, the second lower flange section 192, the third lower flange section 194, the fourth lower flange section 196, and/or the fifth lower flange section 198) is different than at least another one of the lower flange sections. As an example, a lower flange width of the second lower flange section 192 may be generally wider than a lower flange width of the first lower flange section 190 and/or the third lower flange section 194.

In some examples, a lower flange width of each one of the lower flange sections (e.g., the first lower flange section 190, the second lower flange section 192, the third lower flange section 194, the fourth lower flange section 196, and the fifth lower flange section 198) is constant along a portion of the length 114 of the elongate structure 102 that includes the corresponding lower flange section. For example, a lower flange width of each one of the first lower flange section 190, the second lower flange section 192, the third lower flange section 194, the fourth lower flange section 196, the fifth lower flange section 198 is constant along a length of the respective lower flange section. In some examples, a lower flange width of one or more of the lower flange sections (e.g., the first lower flange section 190, the second lower flange section 192, the third lower flange section 194, the fourth lower flange section 196, and/or the fifth lower flange section 198) is variable along a portion of the length 114 of the elongate structure 102 that includes the corresponding lower flange section. For example, a lower flange width of at least one of the first lower flange section 190, the second lower flange section 192, the third lower flange section 194, the fourth lower flange section 196, and/or the fifth lower flange section 198 is variable along a length of the respective upper flange section.

In some examples of the elongate structure 102, the lower flange 122 has a constant or uniform cross-section along the entire length 114 of the elongate structure 102. In an example, the elongate structure 102 includes the lower flange 122 extending along the entire length 114 of the elongate structure 102 and the lower flange width 144 (FIG. 5) is constant along the entire length 114 of the elongate structure 102. In an example, the lower flange 122 includes one or both of the first lower flange portion 148 and/or the second lower flange portion 150 extending along the entire length 114 of the elongate structure 102 and the first lower flange portion width 154 (FIG. 5) and/or the second lower flange portion width 156 (FIG. 5) are constant along the entire length 114 of the elongate structure.

In some examples of the elongate structure 102, as illustrated in FIG. 7, the upper flange 128 has a constant or uniform cross-section along the entire length 114 of the elongate structure 102. In an example, the elongate structure 102 includes the upper flange 128 extending along the entire length 114 of the elongate structure 102 and the upper flange width 146 (FIG. 5) is constant along the entire length 114 of the elongate structure 102. In an example, the upper flange 128 includes one or both of the first upper flange portion 158 and/or the second upper flange portion 160 extending along the entire length 114 of the elongate structure 102 and the first upper flange portion width 164 (FIG. 5) and/or the second upper flange portion width 166 (FIG. 5) are constant along the entire length 114 of the elongate structure.

In some examples of the elongate structure 102, as illustrated in FIGS. 6 and 8, the upper flange 128 has a variable or non-uniform cross-section along at least a portion of the length 114 of the elongate structure 102. In an example, the elongate structure 102 includes the upper flange 128 extending along a portion (e.g., only certain portions) of the length 114 of the elongate structure 102 and the upper flange width 146 (FIG. 5) is variable along at least a portion of the length 114 of the elongate structure 102. In an example, the upper flange 128 includes one or both of the first upper flange portion 158 and/or the second upper flange portion 160 extending along a portion of the length 114 of the elongate structure 102 and the first upper flange portion width 164 (FIG. 5) and/or the second upper flange portion width 166 (FIG. 5) are variable along at least a portion of the length 114 of the elongate structure 102. For example, the first upper flange portion width 164 and/or the second upper flange portion width 166 may vary continuously along the length 114 of the elongate structure 102 or may include varying sections and constant sections along different portions of the length 114 of the elongate structure 102.

In some examples, as illustrated in FIGS. 6 and 8, the upper flange 128 (the first upper flange portion 158 and/or the second upper flange portion 160) includes a plurality of upper flange sections, such as a first upper flange section 184, a second upper flange section 186, a third upper flange section 188, etc. In some examples, the upper flange width 146 (the first upper flange portion width 164 and/or the second upper flange portion width 166) is, or defines, a minimum width along certain portions of the length 114 of the elongate structure 102, for example, between adjacent ones of the upper flange sections. In some examples, the upper flange width 146 (the first upper flange portion width 164 and/or the second upper flange portion width 166) is, or defines, a maximum width along certain other portions of the length 114 of the elongate structure 102, for example, along the upper flange sections. In some examples, a region of the elongate structure 102 without the upper flange 128 separates adjacent ones of the upper flange sections (e.g., between the first upper flange section 184 and the second upper flange section 186 or between the second upper flange section 186 and the third upper flange section 188). In other words, the minimum width of the upper flange width 146 (the first upper flange portion width 164 or the second upper flange portion width 166) may be close to zero along certain portions of the length 114 of the elongate structure 102, such as between upper flange sections.

In some examples, an upper flange width each of one of the upper flange sections (e.g., the first upper flange section 184, the second upper flange section 186, and the third upper flange section 188) is generally or approximately equivalent. In some examples, an upper flange width of at least one of the upper flange sections (e.g., the first upper flange section 184, the second upper flange section 186, and/or the third upper flange section 188) is different than at least another one of the upper flange sections. As an example, an upper flange width of the second upper flange section 186 may be generally wider than an upper flange width of the first upper flange section 184 and/or the third upper flange section 188.

In some examples, an upper flange width of each one of the upper flange sections (e.g., the first upper flange section 184, the second upper flange section 186, and the third upper flange section 188) is constant along a portion of the length 114 of the elongate structure 102 that includes the corresponding upper flange section. For example, an upper flange width of each one of the first upper flange section 184, the second upper flange section 186, and the third upper flange section 188 is constant along a length of the respective upper flange section. In some examples, an upper flange width of one or more of the upper flange sections (e.g., the first upper flange section 184, the second upper flange section 186, and/or the third upper flange section 188) is variable along a portion of the length 114 of the elongate structure 102 that includes the corresponding upper flange section. For example, an upper flange width of at least one of the first upper flange section 184, the second upper flange section 186, and/or the third upper flange section 188 is variable along a length of the respective upper flange section.

Referring to FIGS. 7-9, in some examples, the support structure 104 includes a wall structure 264 that includes a support structure upper flange 200 and a support structure lower flange 202 that are connected by a support structure web 204. In some examples, the support structure lower flange 202 extends laterally outwards from one side or both sides of the support structure web 204. In some examples, the support structure upper flange 200 extends laterally outwards from one side or both sides of the support structure web 204. The support structure 104 includes, or defines, an opening 206 (commonly referred to as a mouse hole). The opening 206 forms, or defines, a keyway through which the elongate structure 102 passes or extends through the support structure 104. The opening 206 is generally complementary to a cross-sectional shape of the elongate structure 102 (e.g., the a web and flange configuration of the elongate structure 102). The opening 206 enables the elongate structure 102 to cross over, extend through, or be spliced by the support structure 104, preferably, along the panel structure 108. The opening 206, through which the elongate structure 102 passes, has an opening height 258.

Referring to FIG. 9, in an example, the support structure web 204 includes, or defines, a support structure web opening 208. The support structure web opening 208 is a portion of the opening 206 through which the web 120 and the upper flange 128 of the elongate structure 102 pass or extend through the support structure 104. The support structure web opening 208 is generally complementary to a cross-sectional shape of the web 120 and the upper flange 128 of the elongate structure 102. In an example, the support structure lower flange 202 includes, or defines, a support structure lower flange opening 210. The support structure lower flange opening 210 intersects the support structure web opening 208. The support structure lower flange opening 210 is a portion of the opening 206 through which the lower flange 122 of the elongate structure 102 passes or extends through the support structure 104. The support structure lower flange opening 210 is generally complementary to a cross-sectional shape of the lower flange 122 of the elongate structure 102. Together, the support structure web opening 208 and the support structure lower flange opening 210 enable the elongate structure 102 to extend through (e.g., be spliced by) the support structure 104, preferably, along the panel structure 108.

In some examples, the support structure web 204 of the support structure 104 includes an area of increased thickness, referred to as a thickened area 212, located around (e.g., surrounding) the opening 206. In an example, the thickened area 212 is located around the support structure web opening 208 and the support structure lower flange opening 210.

In some examples, a portion of the support structure web opening 208 is circular. The thickened area 212 of the support structure web 204 and the circular portion of the support structure web opening 208 may help guard against or resist crack initiation and propagation in the support structure 104 during loading of the structural assembly 100 and to help stabilize the support structure upper flange 200 of the support structure 104. In an example, a portion of the support structure web 204, for example, localized about the thickened area 212 includes a planar surface 214. As those of ordinary skill in the art will recognize, the size, shape, material construction, and geometrical shape of the elongate structure 102 and/or the support structure 104 can be varied to suit the type of structural assembly 100 (e.g., fuselage or wing) being assembled, and, therefore, the various components of the structural assembly 100 as depicted herein should not be considered limiting.

Because the elongate structure 102 extends through the support structure 104, contact of the support structure lower flange 202 of the support structure 104 with the panel structure 108 occurs at a plurality of circumferentially oriented surfaces defined by the support structure lower flange 202. In other words, the support structure lower flange opening 210 interrupts the contact of a bottom surface of the support structure lower flange 202 with the mounting (e.g., inner) surface of the panel structure 108 as the support structure lower flange 202 extends along the mounting surface of the panel structure 108. Overlapping portions are formed between the support structure lower flange 202 at an intersection of the elongate structure 102 and the support structure 104. This overlapping portion helps to ensure that the elongate structure 102 and the support structure 104 help to form a plurality of continuous circumferential outer surfaces that arrest crack propagation.

Referring to FIG. 9, in some examples, the opening height 258 of the opening 206 is greater than the height 110 (the localized height 242) of the elongate structure 102 proximate to the support structure 104. In an example, the opening height 258 is greater than the minimum height 116 of the elongate structure 102 (the localized height 242 of the elongate structure 102 at a location along the length 114 of the elongate structure 102 corresponding to where the elongate structure 102 intersects the support structure 104 and passes through the opening 206). In other words, an upper portion of the opening 206 is located, or resides, above an upper end (e.g., the upper flange 128) of the elongate structure 102.

In some examples, the opening height 258 of the opening 206 is less than the height 110 (the localized height 242) of the elongate structure 102 at a location that is spaced away from the support structure 104. In an example, the opening height 258 is less than the maximum height 118 of the elongate structure 102 (the localized height 242 of the elongate structure 102 at a location along the length 114 of the elongate structure 102 corresponding to the location 112 that is spaced away from the support structure 104 or that resides between the adjacent and opposed pair of support structures 104). In other words, the upper portion of the opening 206 is located, or resides, below the upper end (e.g., the upper flange 128) of the elongate structure 102.

This arrangement of the opening height 258 beneficially enables a decrease, or reduction, in a thickness of the support structure 104 and, in particular, a decrease in a thickness of the otherwise thickened area 212 of the support structure 104 by increasing a dimension of the support structure 104 extending from an upper end of the opening 206 to an upper end of the support structure web 204.

Figure 10:
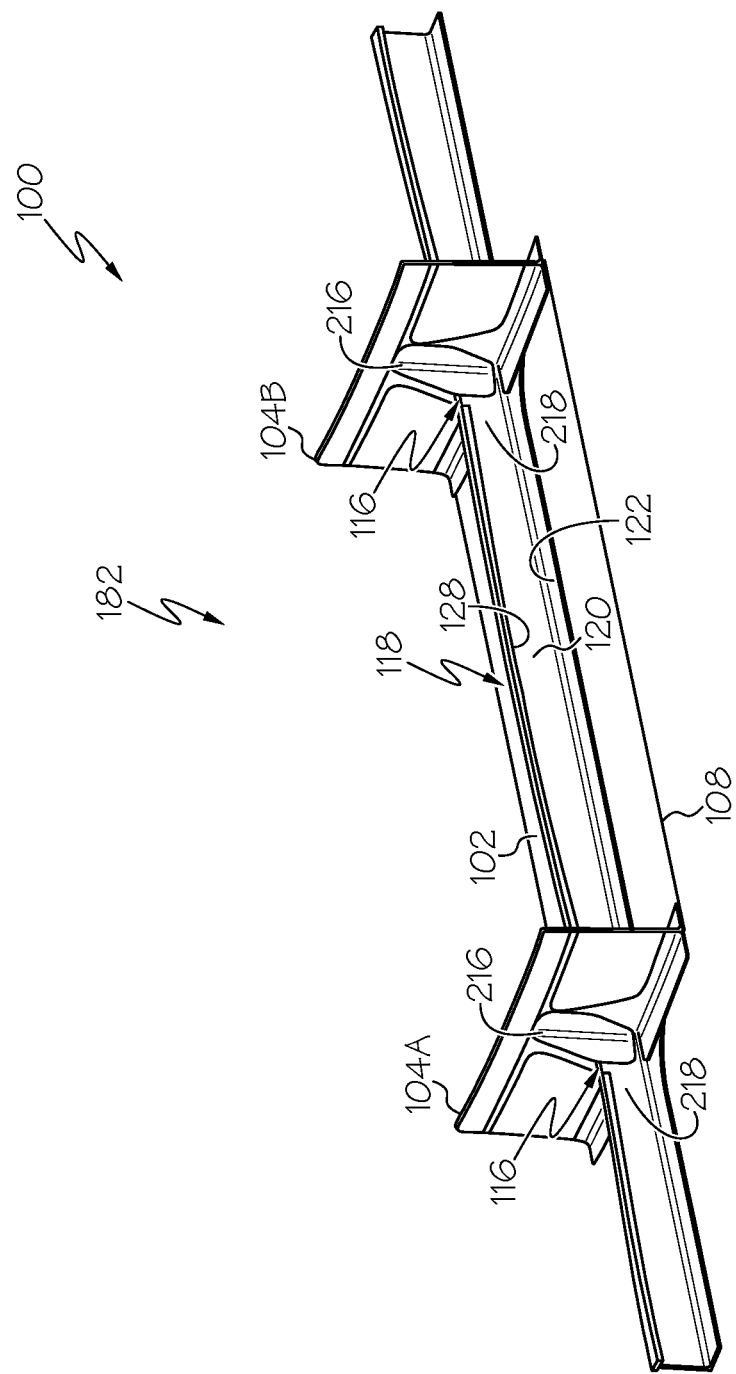
FIG. 10 is a schematic, partial, perspective view of an example of the structural assembly.
Figure 11:
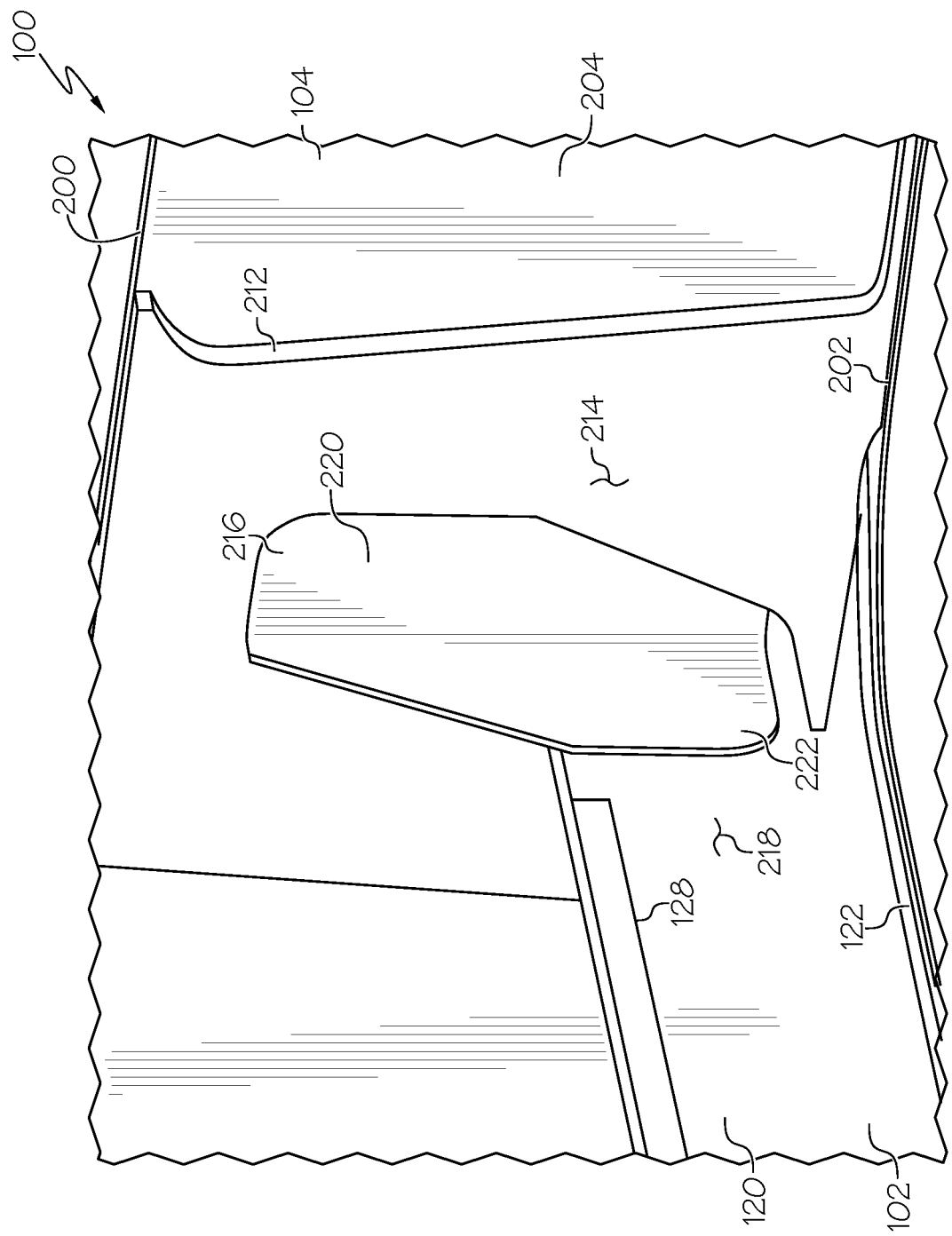
FIG. 11 is a schematic, partial, perspective view of an example of the structural assembly.
Figure 12:
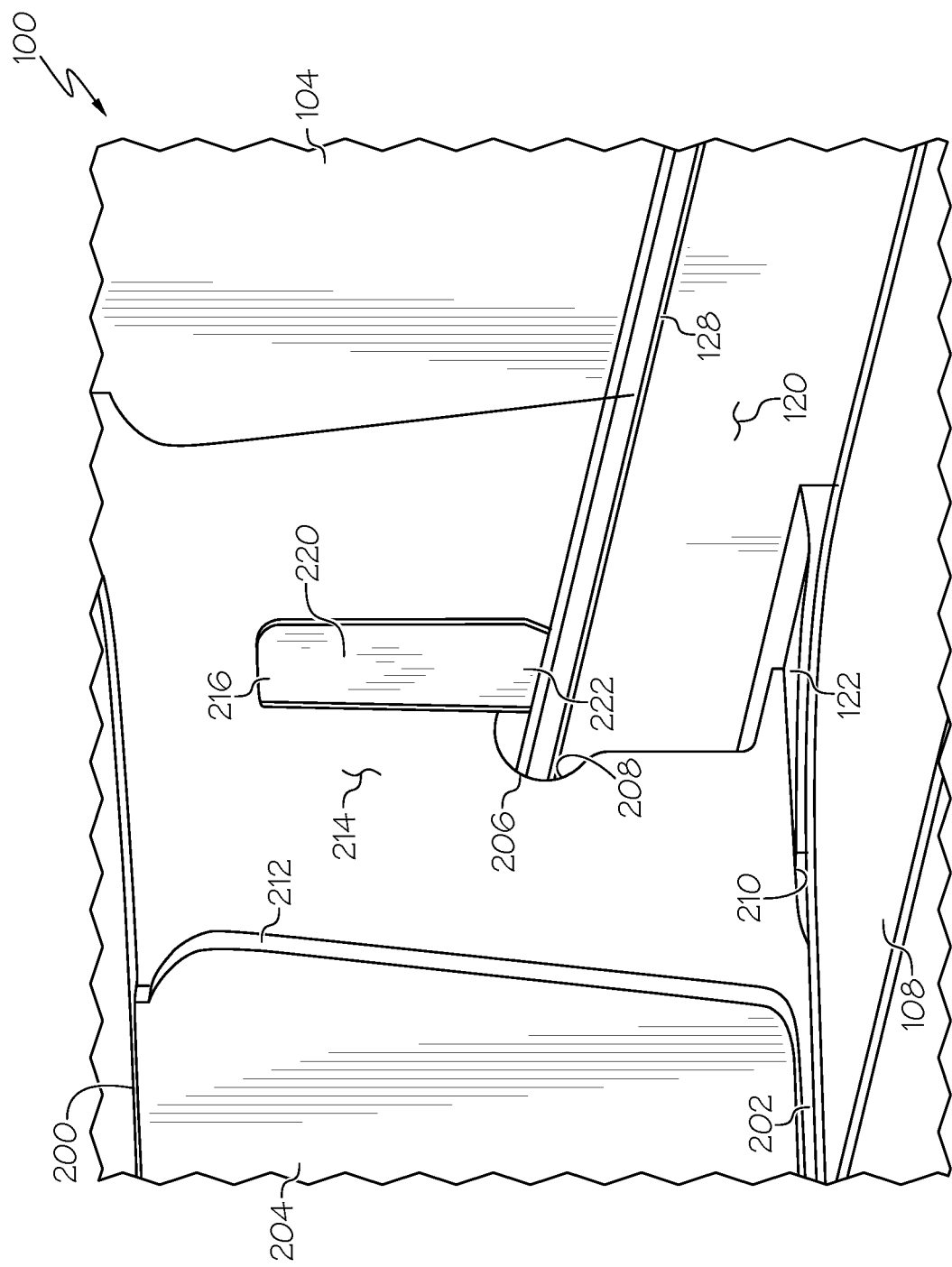
FIG. 12 is a schematic, partial, perspective view of an example of the structural assembly.

FIG. 10 illustrates a portion of an example of the disclosed structural assembly 100 including the elongate structure 102, a portion of the panel structure 108, a portion of the opposed pair of support structures 104 (e.g., the first support structure 104A and the second support structure 104B), and mounting clips 216 (also referred to individually as mounting clip 216). FIGS. 11 and 12 each illustrate a portion of an example of the disclosed structural assembly 100 the elongate structure 102 operatively coupled to the support structure 104 by way of the mounting clip 216.

Referring to FIG. 10, in some examples, the structural assembly 100 includes the mounting clips 216. The mounting clips 216 are used to operatively couple the elongate structure 102 with the support structure 104. In some examples, the elongate structure 102 includes, or is provided with, one or more clip mounting surfaces 218. In some examples, one or more portions of the elongate structure 102 may be fabricated to have a generally planar surface, in which such planar surfaces are used as the mounting surface 218 for mounting an elongated structural mounting clip 216 to the elongate structure 102. In an example, one or more portions of the upper flange 128 of the elongate structure 102 are formed to have a generally planar surface that is used as the mounting surface 218 for coupling the mounting clip 216 to the elongate structure 102. In an example, one or more portions of the web 120 of the elongate structure 102 are formed to have a generally planar surface that is used as the mounting surface 218 for coupling the mounting clip 216 to the elongate structure 102. In some examples, the mounting surfaces 218 are positioned along the length 114 of the elongate structure 102 so as to coincide with the portion, or section, of the elongate structure 102 that passes through the opening 206 in, or provided by, the support structure 104.

Referring to FIGS. 11 and 12, in some examples, the mounting clip 216 includes a first body portion 220 and a second body portion 222 that extends from the first body portion 220. In some examples, the first body portion 220 and the second body portion 222 are oriented, or reside, perpendicular to each other. In an example, the first body portion 220 includes a clip first mounting surface. In the illustrated example, the clip first mounting surface is generally planar and is coupled to the planar surface 214 of the thickened area 212 of the support structure web 204 of the support structure 104 proximate to (e.g., at or near) the opening 206 (FIG. 12) in the support structure 104. In an example, the second body portion 222 includes a clip second mounting surface. In the illustrated example, the clip second mounting surface is generally planar and is coupled to the planar mounting surface 218 of the web 120 of the elongate structure 102 proximate to (e.g., at or near) the opening 206 in the support structure 104.

The mounting clip 216 is coupled to the support structure 104 and the elongate structure 102 in any one of a variety of ways. As examples, the mounting clip 216 may be coupled in place by an adhesive, by being bonded, by being cured, by being riveted, or by using any other suitable mounting technique.

One advantage of the use of the mounting clips 216 with the disclosed structural assembly 100 is that such mounting clips 216 can be generally quickly and easily mounted since no special machining of the mounting clip 216 is required since it may be installed along a corresponding generally planar or flat surface of the support structure 104. Similarly, the mounting clip 216 may also be generally quickly and easily installed along a corresponding generally planar surface of the elongate structure 102. Consequently, no additional machining or fabrication of the elongate structure 102 is required. Moreover, since the mounting clip 216 may be installed along the generally planar surfaces of both the support structure 104 and the elongate structure 102, the installed mounting clip 216 may remain in place even when the structural assembly 100 is subjected to heightened vibrational forces and other loads and forces, such as those that aircraft frequently encounter. Another advantage of such a mounting clip configuration is that a thickness of the mounting clip 216 may be varied, depending on the overall load that the elongate structure 102 is designed to carry. Such thickness of the mounting clip 216 may be varied without altering the elongate structure 102 and/or the support structure 104.

Figure 13:
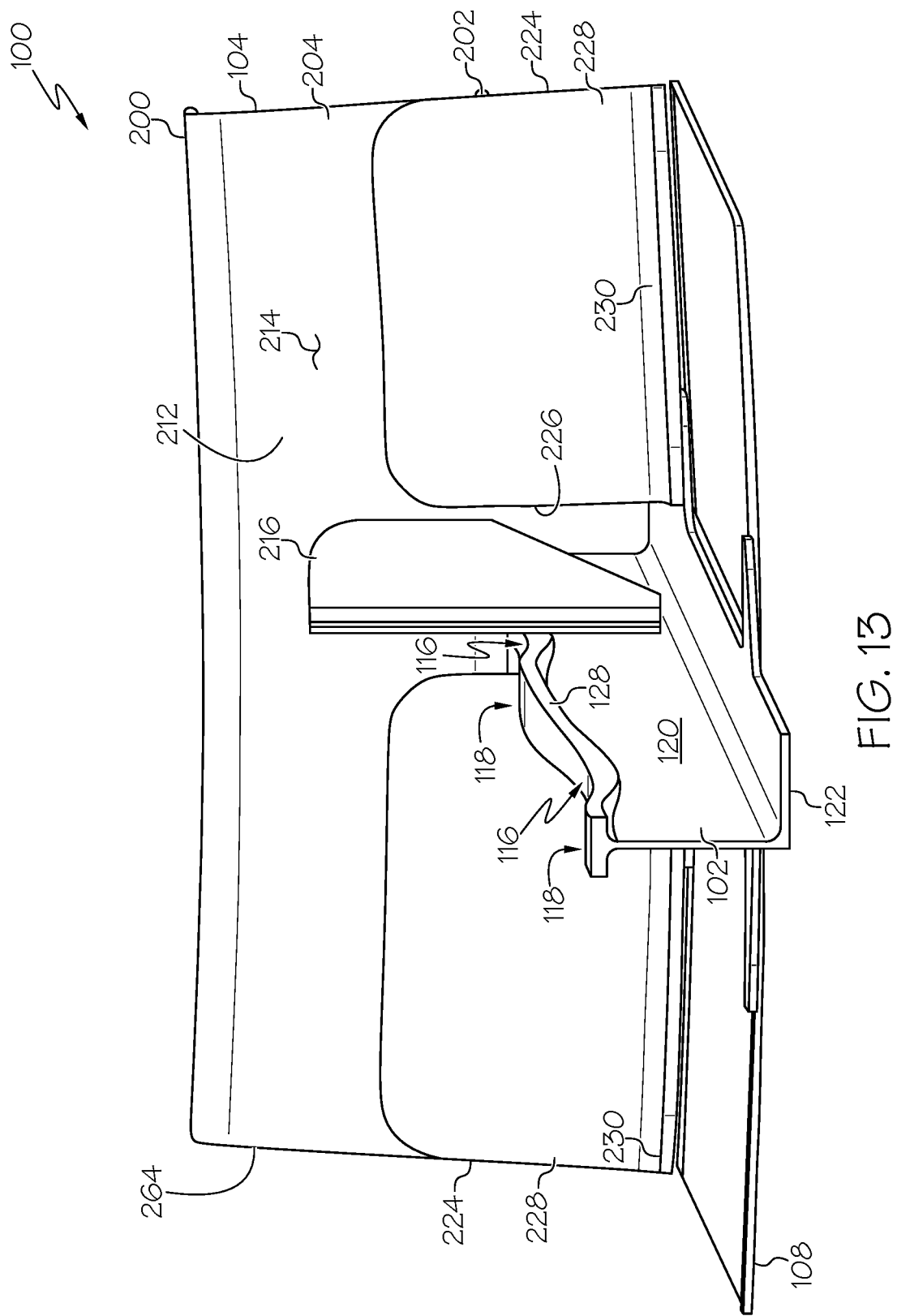
FIG. 13 is a schematic, partial, perspective view of an example of the structural assembly.
Figure 14:
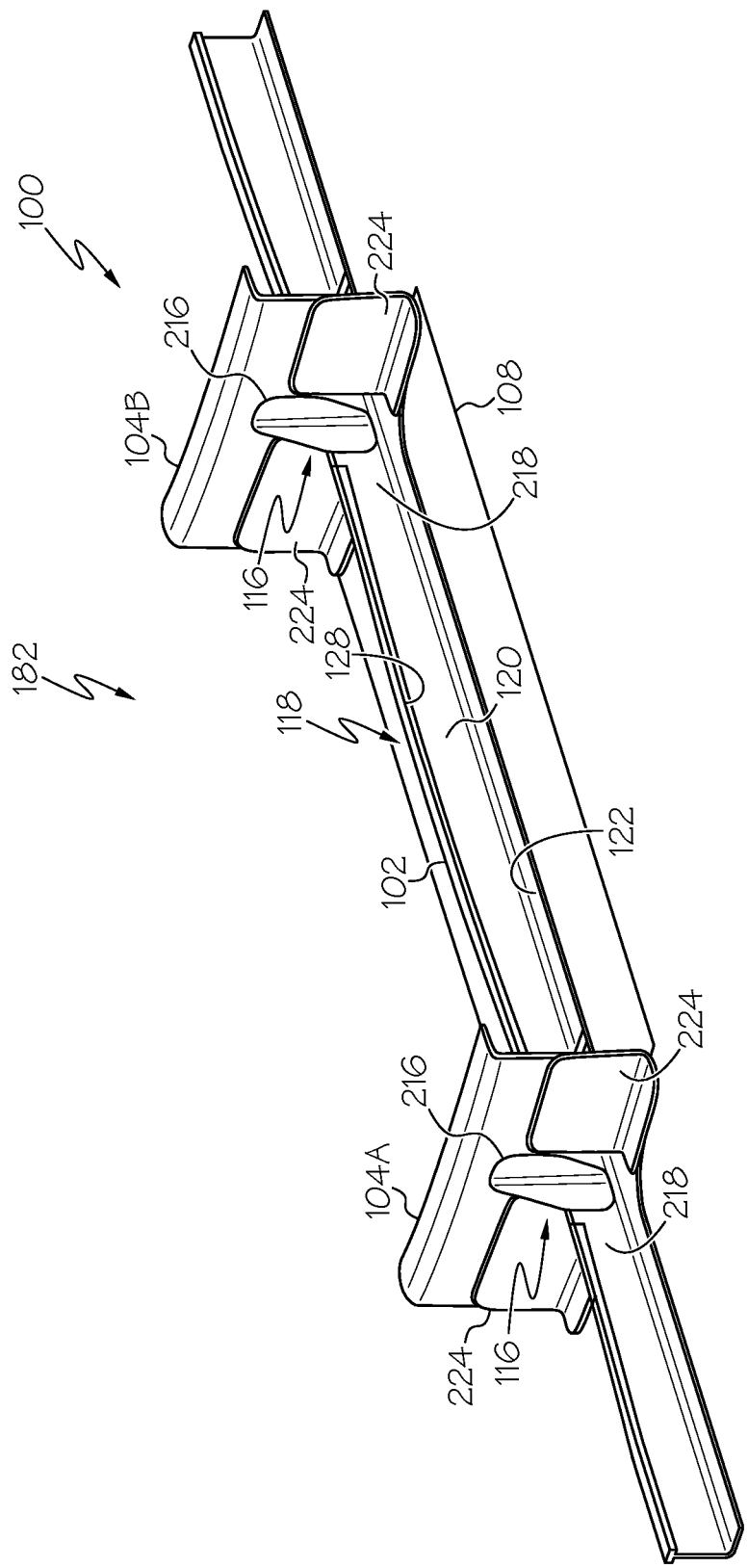
FIG. 14 is a schematic, perspective view of an example of a portion of the disclosed structural assembly.
Figure 15:
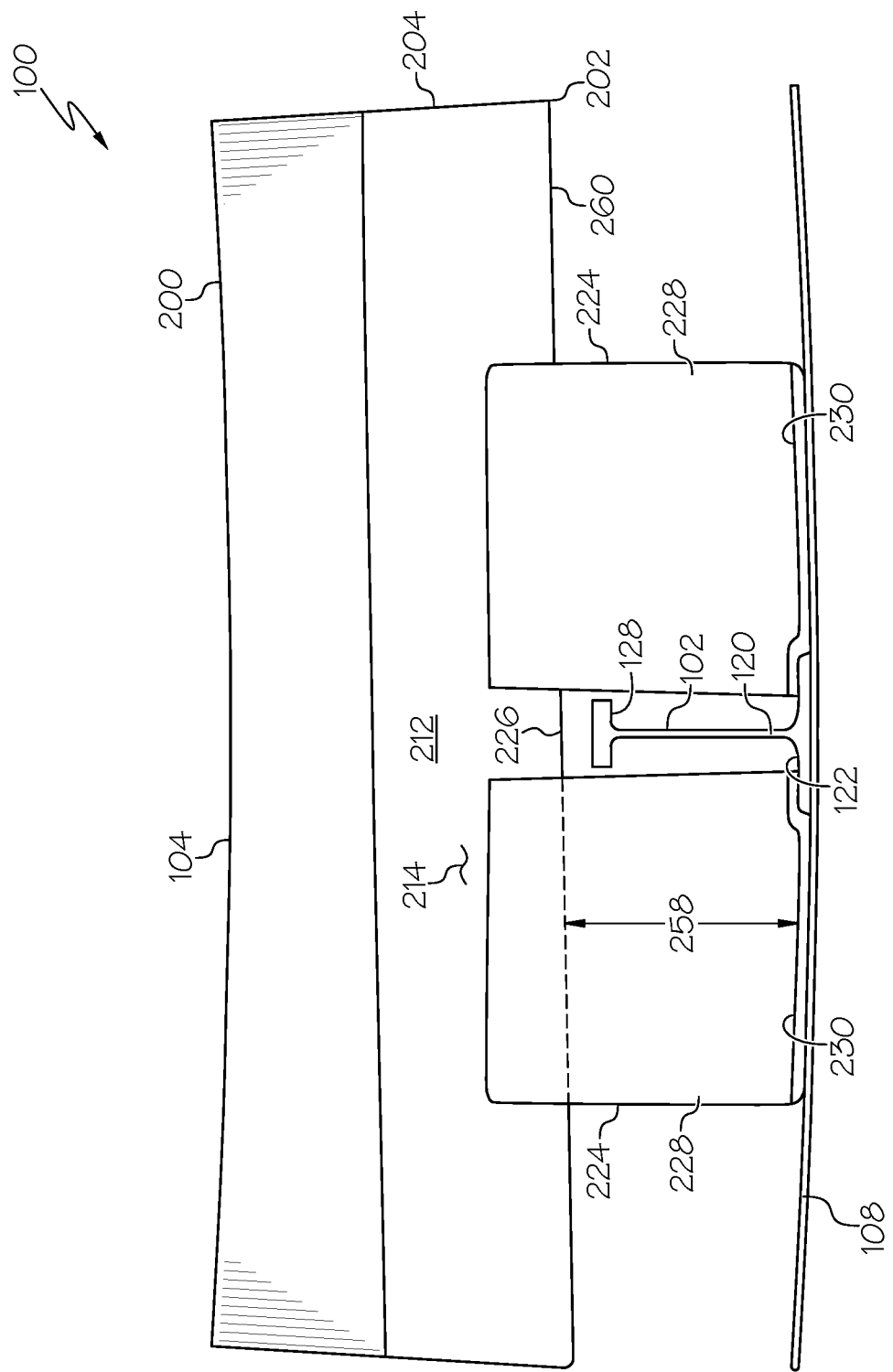
FIG. 15 is a schematic, partial, sectional view of an example of the structural assembly.

FIG. 13 illustrates a portion of an example of the disclosed structural assembly 100 including a portion of the elongate structure 102, a portion of the panel structure 108, a portion of the support structure 104, and brackets 224 (also referred to individually as bracket 224). FIG. 14 illustrates a portion of an example of the disclosed structural assembly 100 including the elongate structure 102, a portion of the panel structure 108, a portion of the opposed pair of support structures 104 (e.g., the first support structure 104A and the second support structure 104B), and brackets 224. FIG. 15 illustrates a section of an example of a portion of the disclosed structural assembly 100 including the elongate structure 102, having a cross-section taken proximate to (e.g., at or near the support structure 104), a portion of the panel structure 108, a portion of the support structure 104, and the brackets 224.

Referring to FIG. 13-15, in some examples, rather than the support structure 104 being directly coupled to the panel structure 108 (as illustrated in FIGS. 6-10), the support structure 104 is spaced away from the panel structure 108 and the brackets 224 operatively couple the support structure 104 with the panel structure 108. Generally, the bracket 224 serves as a splice that ties the support structure 104 to the panel structure 108.

Referring to FIG. 13, in an example, each one of the brackets 224 includes a bracket web 228 and a bracket flange 230, or foot that extends laterally outward from one side of the bracket web 228. In some examples, a portion of the bracket web 228 is mounted to the planar surface 214 of the thickened area 212 of the support structure web 204 of the support structure 104. Another portion of the bracket web 228 extends from the support structure 104 to the panel structure 108 such that the support structure 104 is spaced away from the panel structure 108. The bracket flange 230 is coupled to the mounting surface of the panel structure 108. In some examples, the bracket flange 203 is also coupled to the lower flange 122 of the elongate structure 102.

In some examples, an area residing between the support structure 104, the panel structure 108, and the adjacent pair of brackets 224 defines an opening 226. Like the opening 206 (FIGS. 7-9), the opening 226 forms, or defines, a keyway through which the elongate structure 102 passes or extends through the support structure 104. The opening 226 is generally complementary to a cross-sectional shape of the elongate structure 102 (e.g., the a web and flange configuration of the elongate structure 102). The opening 226 enables the elongate structure 102 to cross over, extend through, or be spliced by the support structure 104 and the brackets 224, preferably, along the panel structure 108. The opening 226, through which the elongate structure 102 passes, has the opening height 258.

Referring to FIG. 15, in some examples, the opening height 258 of the opening 226 is greater than the height 110 (the localized height 242) of the elongate structure 102 proximate to the support structure 104. In an example, the opening height 258 is greater than the minimum height 116 of the elongate structure 102 (the localized height 242 of the elongate structure 102 at a location along the length 114 of the elongate structure 102 corresponding to where the elongate structure 102 intersects the support structure 104 and passes through the opening 226). In other words, an upper portion of the opening 226 is located, or resides, above an upper end of the elongate structure 102.

In some examples, the opening height 258 of the opening 226 is less than the height 110 (the localized height 242) of the elongate structure 102 at a location that is spaced away from the support structure 104. In an example, the opening height 258 is less than the maximum height 118 of the elongate structure 102 (the localized height 242 of the elongate structure 102 at a location along the length 114 of the elongate structure 102 corresponding to the location 112 that is spaced away from the support structure 104 or that resides between the adjacent and opposed pair of support structures 104). In other words, the upper portion of the opening 226 is located, or resides, below the upper end (e.g., the upper flange 128) of the elongate structure 102.

In some examples where the support structure 104 is spaced away from the panel structure 108, such as when the support structure 104 is coupled to the panel structure 108 with the brackets 224, a support structure lower end 260 of the support structure 104 is located, or resides, below the maximum height 118 of the elongate structure 102 (the localized height 242 of the elongate structure 102 at a location along the length 114 of the elongate structure 102 corresponding to the location 112 that is spaced away from the support structure 104 or that resides between the adjacent and opposed pair of support structures 104).

Figure 16:
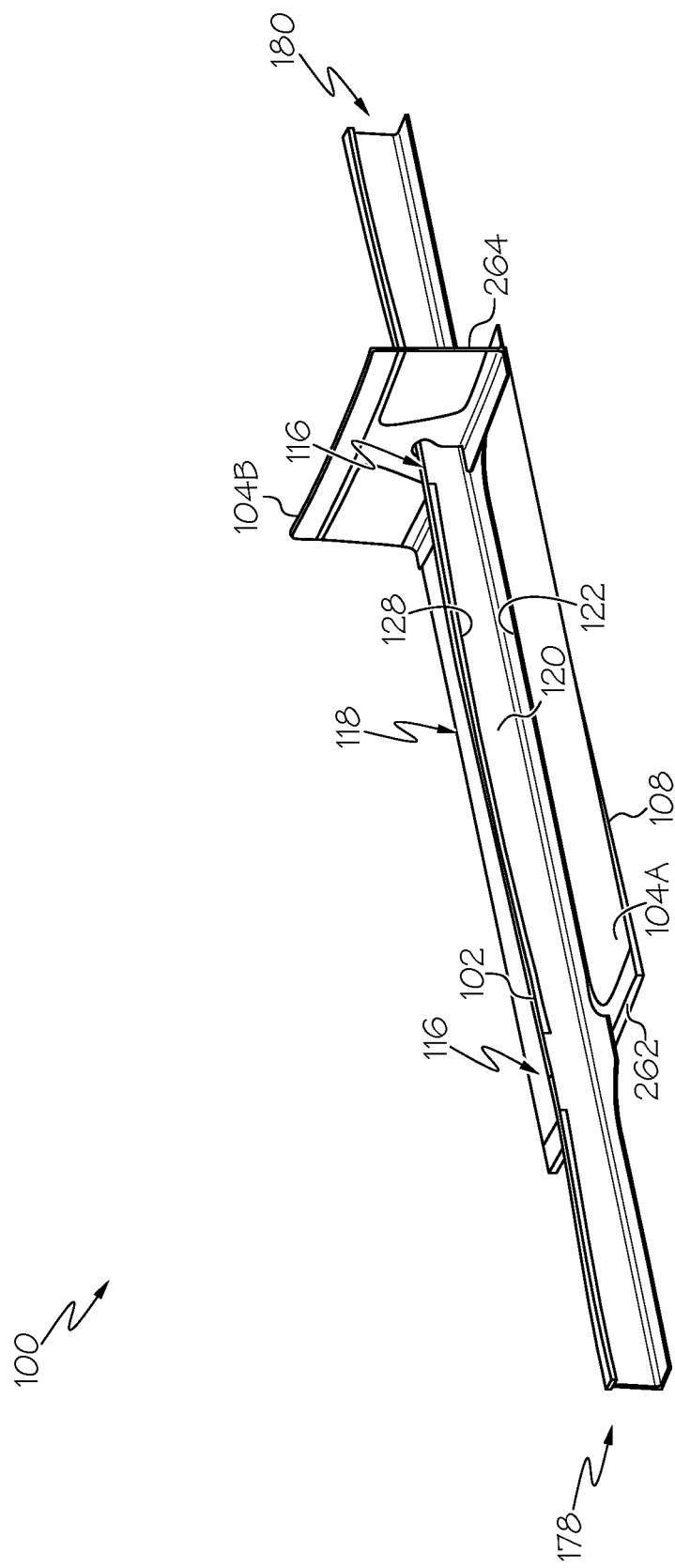
FIG. 16 is a schematic, partial, perspective view of an example of the structural assembly.

FIG. 16 illustrates a portion of an example of the disclosed structural assembly 100 including a portion of the elongate structure 102, a portion of the panel structure 108, and a portion of the opposed pair of support structures 104 (e.g., the first support structure 104A and the second support structure 104B).

Referring to FIG. 16, in some examples, at least one of the support structures 104 (e.g., the first support structure 104A) includes, or takes the form of, a pad-up 262 located on or integral to the panel structure 108. In some examples, the pad-up 262 includes a localized increase in the panel thickness 168 (FIG. 5) of the panel structure 108 that serves as the mounting surface 176 for the elongate structure 102. In some examples, the pad-up 262 includes a shim or wedge structure coupled to the inner surface of the panel structure 108 and that serves as the mounting surface 176 for the elongate structure 102.

While not explicitly illustrated, in some examples, both of the opposed pair of support structures 104 (e.g., the first support structure 104A and the second support structure 104B) include, or take the form of, the pad-up 262. In some other examples, one of the pair of support structures 104 (e.g., the first support structure 104A) includes the pad-up 262 and an opposite one of the pair of support structures 104 (e.g., the second support structure 104B) includes the wall structure 264.

Figure 17:
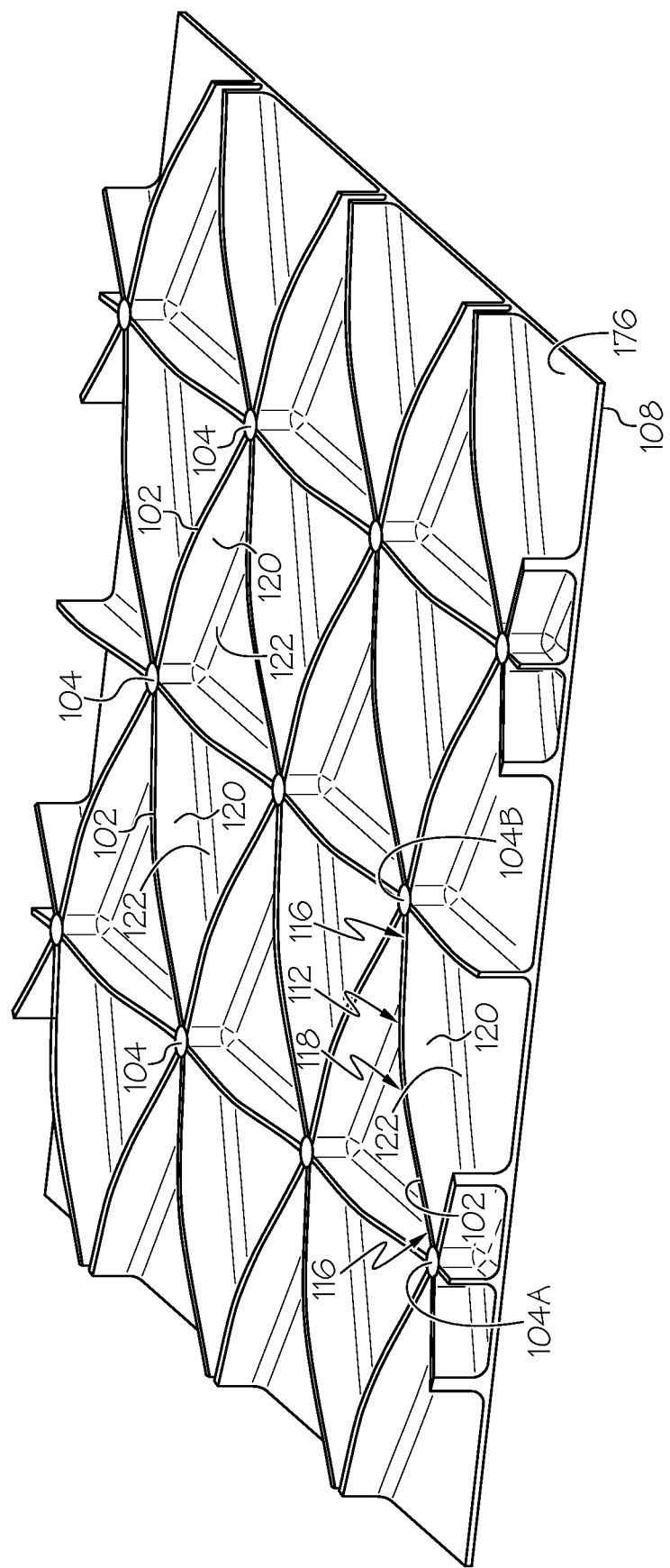
FIG. 17 is a schematic, partial, perspective view of an example of the structural assembly.

FIG. 17 illustrates a portion of an example of the disclosed structural assembly 100 including a plurality of the elongate structures 102 and the skin panel 108. In an example, the structural assembly 100 is, or takes the form of, an isogrid or orthogrid structure in which the panel structure 108 forms a plate or face sheet and the plurality of elongate structures 102 intersect to form a lattice structure including a series of triangular, square, or diamond-shaped stiffening ribs (i.e., triangular, square, or diamond-shaped spaces defined between the elongate structures 102).

Referring to FIG. 17, in some examples, one or more of the elongate structures 102 includes the lower flange 122 and the web 120, extending from the lower flange 122. In some examples, one or more of the elongate structures 102 includes only the web 120, extending directly from the skin panel 108. In some examples, one or more of the elongate structures 102 includes the lower flange 122, the upper flange 128, and the web 120, extending between the lower flange 122 and the upper flange 128.

In some examples, the elongate structure 102 is coupled to the panel structure 108. In an example, the lower flange 122 is coupled to the mounting surface 176 of panel structure 108 (e.g., via fasteners, structural bonding, etc.).

In some examples, the elongate structure 102 is integral to the panel structure 108. In an example, the lower flange 122 and the web 120 of the elongate structure 102 and the panel structure 108 are integrally formed (e.g., via co-curing, additive manufacturing, machining or other subtractive manufacturing, etc.). In an example, the web 120 of the elongate structure 102 and the panel structure 108 are integrally formed (e.g., via co-curing, additive manufacturing, machining or other subtractive manufacturing, etc.). Thus, in some examples, the structural assembly 100 is (e.g., is formed by) a monolithic structure that is fabricated, for example, from a metallic material (e.g., a monolithic, metallic structure) or a reinforced polymer composite material (e.g., a monolithic, composite structure).

In some examples, the support structure 104 is, or takes the form of, a structural node that forms a junction or intersection of a plurality of the elongate structures 102. In other words, the support structure 104 is structural member coupled to the panel structure 108 at which a plurality of the elongate structures intersect each other or at which ends of a plurality of the elongate structures 102 join each other.

In an example, the length 114 of the elongate structure 102 is defined between an adjacent, opposed pair of the support structures 104 (or structural nodes). The height 110 of the elongate structure 102, or the web height 124 of the web 120, is variable along the length 114 of the elongate structure 102. In some examples, the height 110, or the web height 124, varies continuously along the length 114 of the elongate structure 102. In some examples, the height 110, or the web height 124, has both constant height portions along certain lengths of the elongate structure 102 and variable height portions along different lengths of the same elongate structure 102.

In some examples, the web thickness 254 of the web 120 is variable along the length 114 of the elongate structure 102. In some examples, the web thickness 254 of the web 120 varies continuously along the length 114 of the elongate structure 102. In some examples, the web thickness 254 of the web 120 has both constant thickness portions along certain lengths of the elongate structure 102 and variable thickness portions along different lengths of the same elongate structure 102.

In some examples, the height 110 of the elongate structure 102 is, or defines, the minimum height 116 of the elongate structure 102 located, or residing, proximate to the frame structure 104 (the structural node), such as proximate to at least one of the first frame structure 104A and/or the second frame structure 104B. In some examples, the height 110 of the elongate structure 102 is, or defines, the maximum height 118 of the elongate structure 102 at the location 112 between the adjacent, opposed pair of the frame structures 104. In some examples, the location 112 of the maximum height 118 of the elongate structure 102 is midway between the first frame structure 104A and the second frame structure 104B.

In some examples, the web height 124 of the web 120 is, or defines, the minimum web height 132 at one or more locations along the length 114 of the elongate structure 102 corresponding to the minimum height 116 of the elongate structure 102. The web height 124 of the web 120 is, or defines, the maximum web height 134 at one or more locations along the length 114 of the elongate structure 102 corresponding to the maximum height 118 of the elongate structure 102.

In some examples, the minimum web height 132 corresponds to at least one of the minimum mass 266 and/or the minimum volume 278 of the elongate structure 102. In some examples, the maximum web height 134 corresponds to at least one of the minimum mass 238 and/or the minimum volume 278 of the elongate structure 102.

In some examples, the minimum web height 132 corresponds to at least one of the maximum mass 268 and/or the maximum volume 280 of the elongate structure 102. In some examples, the maximum web height 134 corresponds to at least one of the maximum mass 268 and/or the maximum volume 280 of the elongate structure 102.

In some examples, the web thickness 254 of the web 120 is, or defines, the minimum web thickness 270 at one or more locations along the length 114 of the elongate structure 102 and the maximum web thickness 272 at one or more other locations along the length 114 of the elongate structure 102.

In some examples, the minimum web thickness 270 corresponds to the minimum height 116 of the elongate structure 102 and/or the minimum web height 132 of the web 120. In some examples, the minimum web thickness corresponds to the maximum height 118 of the elongate structure 102 and/or the maximum web height 134 of the web 120.

In some examples, the maximum web thickness 272 corresponds to the minimum height 116 of the elongate structure 102 and/or the minimum web height 132 of the web 120. In some examples, the maximum web thickness 272 corresponds to the maximum height 118 of the elongate structure 102 and/or the maximum web height 134 of the web 120.

In some examples, the minimum web thickness 270 corresponds to at least one of the minimum mass 266 and/or the minimum volume 278 of the elongate structure 102. In some examples, the minimum web thickness 270 corresponds to at least one of the maximum mass 268 and/or the maximum volume 280 of the elongate structure 102.

In some examples, the maximum web thickness 272 corresponds to at least one of the minimum mass 266 and/or the minimum volume 278 of the elongate structure 102. In some examples, the maximum web thickness 272 corresponds to at least one of the maximum mass 268 and/or the maximum volume 280 of the elongate structure 102.

Referring to FIGS. 1-3 and 5-16, accordingly, the structural assembly 100 includes at least one support structure 104, such as the first support structure 104A. In some examples, the structural assembly 100 includes a plurality of support structures 104, such as the first support structure 104A and the second support structure 104B, which is spaced away from and located opposite and adjacent to the first support structure 104A.

The structural assembly 100 also includes at least one elongate structure 102. In some examples, the structural assembly 100 includes the plurality of elongate structures 102. The elongate structure 102 intersects the support structure 104. In some examples, the elongate structure 102 is coupled to the support structure 104. In some examples, the elongate structure 102 extends, or passes though, the support structure 104. In some examples, the elongate structure 102 intersects each one of the opposing, adjacent pair of support structures 104 (e.g., the first support structure 104A and the second support structure 104B). In some examples, the elongate structure 102 extends, or passes through, one or both of the opposing, adjacent pair of support structures 104.

In some examples, the structural assembly 100 includes at least one panel structure 108. In some examples, the structural assembly 100 includes the plurality of panel structures 108. In some examples, the support structure 104 is coupled to the panel structure 108. In some examples, the elongate structure 102 is coupled to the panel structure 108.

In some examples, the structural assembly 100 includes the support structure 104 and the elongate structure 102 that intersects the support structure 104. The elongate structure 102 has the length 114 and the mass 238. The mass 238 of the elongate structure 102 varies along the length 114 of the elongate structure 102. The localized mass 240 of the elongate structure 102 decreases toward the support structure 104 and increases away from the support structure 104.

In some examples, the elongate structure 102 also has the volume 274. The volume 274 of the elongate structure 102 varies along the length 114 of the elongate structure 102. The localized volume 276 of the elongate structure 102 decreases toward the support structure 104 and increases away from the support structure 104.

Therefore, in some examples, a localized decrease, or reduction, in at least one of the mass 238 and/or the volume 274 of the elongate structure 102 occurs proximate to (e.g., at or near) an intersection of the elongate structure 102 and the support structure 104.

In some examples, a decrease in the localized mass 240 of the elongate structure 102 corresponds to a decrease in the localized volume 276 of the elongate structure 102 and an increase in the localized mass 240 of the elongate structure 102 corresponds to an increase in the localized volume 276 of the elongate structure 102. In some examples, a decrease in the localized volume 276 of the elongate structure 102 corresponds to a decrease in the localized mass 240 of the elongate structure 102 and an increase in the localized volume 276 of the elongate structure 102 corresponds to an increase in the localized mass 240 of the elongate structure 102.

In some examples, the elongate structure 102 has the height 110. The height 110 of the elongate structure 102 varies along the length 114 of the elongate structure 102. The localized height 242 of the elongate structure 102 decreases toward the support structure 104 and increases away from the support structure 104. In some examples, a decrease in the localized height 242 of the elongate structure 102 corresponds to a decrease in the localized mass 240 of the elongate structure 102 and an increase in the localized height 242 of the elongate structure 102 corresponds to an increase in the localized mass 240 of the elongate structure 102. In some examples, a decrease in the localized height 242 of the elongate structure 102 corresponds to a decrease in the localized volume 276 of the elongate structure 102 and an increase in the localized height 242 of the elongate structure 102 corresponds to an increase in the localized volume 276 of the elongate structure 102. In some examples, the localized height 242 of the elongate structure 102 proximate to the support structure 104 is the minimum height 116 of the elongate structure 102 and the localized height 242 of the elongate structure 102 at a location that is spaced away from the support structure 104 is the maximum height 118 of the elongate structure 102.

In some examples, the support structure 104 includes the wall structure 264 having the opening 206. The elongate structure 102 extends through the opening 206. The minimum height 116 of the elongate structure 102 is located at the opening 206 of the support structure 104. In some examples, the opening 206 has the opening height 258. The opening height 258 is less than the maximum height 118 of the elongate structure 102. In some examples, each one of the support structures 104 (e.g., the first support structure 104A and the second support structure 104B) includes, or defines, the opening 206 associated therewith. The elongate structure 102 extends or passes through the opening 206 associated with the first support structure 104A (e.g., a first opening) and extends or passes through the opening 206 associated with the second support structure 104B (e.g., a second opening). The minimum height 116 of the elongate structure 102 is located at the opening 206 associated with each one of the support structures 104.

In some examples, the support structure 104 is the first support structure 104A of the adjacent and opposed pair of support structures 104. The structural assembly 100 also includes a second support structure 104B of the adjacent and opposed pair of support structures 104 that is opposite to and spaced away from the first support structure 104A. The elongate structure 102 extends between the first support structure 104A and the second support structure 104B. The minimum height 116 of the elongate structure 102 is located at an intersection of the elongate structure 102 with the first support structure 104A and at an intersection of the elongate structure 102 with the second support structure 104B. The maximum height 118 of the elongate structure 102 is located midway between the first support structure 104A and with the second support structure 104B.

In some examples, the elongate structure 102 includes the web 120, extending the length 114 of the elongate structure 102, and the lower flange 122, extending from the web 120. The web 120 has the web height 124. The web height 124 of the web 120 varies along the length 114 of the elongate structure 102 and at least partially defines the height 110 of the elongate structure 102. The localized web height 252 of the web 120 decreases toward the support structure 104 and increases away from the support structure 104. In some examples, a decrease in the localized web height 252 of the web 120 corresponds to a decrease in the localized mass 240 of the elongate structure 102 and an increase in the localized web height 252 of the elongate structure 102 corresponds to an increase in the localized mass 240 of the elongate structure 102. In some examples, a decrease in the localized web height 252 of the web 120 corresponds to a decrease in the localized volume 276 of the elongate structure 102 and an increase in the localized web height 252 of the elongate structure 102 corresponds to an increase in the localized volume 276 of the elongate structure 102.

In some examples, the web 120 has the web thickness 254. The web thickness 254 varies along the length 114 of the elongate structure 102. The localized web thickness 256 of the web 120 decreases toward the support structure 104 and increases away from the support structure 104. In some examples, a decrease in the localized web thickness 256 of the web 120 corresponds to a decrease in the localized mass 240 of the elongate structure 102 and an increase in the localized web thickness 256 of the elongate structure 102 corresponds to an increase in the localized mass 240 of the elongate structure 102. In some examples, a decrease in the localized web thickness 256 of the web 120 corresponds to a decrease in the localized volume 276 of the elongate structure 102 and an increase in the localized web thickness 256 of the elongate structure 102 corresponds to an increase in the localized volume 276 of the elongate structure 102.

In some examples, the elongate structure 102 is a monolithic structure. In some examples, the structural assembly 100 is a monolithic structure.

In some examples, the height 110 of the elongate structure 102 decreases along at least one section (e.g., a first section) of the elongate structure 102 or along at least one portion (e.g., a first portion) of the length 114 of the elongate structure 102. In some examples, the height 110 of the elongate structure 102 increases along at least one other section (e.g., a second section) of the elongate structure 102 or along at least one other portion (e.g., a second portion) of the length 114 of the elongate structure 102.

In some examples, the height 110 of the elongate structure 102 increases from the support structure 104 to the location 112 that is spaced away from the support structure 104. In some examples, the height 110 of the elongate structure 102 increases from the first support structure 104A to the location 112, which is located between the first support structure 104A and the second support structure 104B. In some examples, the height 110 of the elongate structure 102 decreases from the location 112, which is between the first support structure 104A and the second support structure 104B, to both the first support structure 104A and the second support structure 104B.

In some examples, the height 110 of the elongate structure 102 is, or defines, the minimum height 116 of the elongate structure 102 located, or residing, proximate to the support structure 104, such as proximate to at least one of the first support structure 104A and/or the second support structure 104B. In some examples, the height 110 of the elongate structure 102 is, or defines, the maximum height 118 of the elongate structure 102 at the location 112. In some examples, the location 112 of the maximum height 118 of the elongate structure 102 is midway between the first support structure 104A and the second support structure 104B. In some examples, the maximum height 118 of the elongate structure 102 is located, or resides, at an approximate middle of the bay 182 defined between the first support structure 104A and the second support structure 104B. In other words, the location 112 where the height 110 of the elongate structure 102 is the maximum height 118 is a midbay location of the structural assembly 100.

In some examples, the web height 124 of the web 120 varies along at least one portion (e.g., a first portion) of the length 114 of the elongate structure 102. The web height 124 of the web 120 along the length 114 of the elongate structure 102 corresponds to the height 110 of the elongate structure 102 along its length 114. In some examples, the web height 124 of the web 120 is, or defines, the minimum web height 132 at one or more locations along the length 114 of the elongate structure 102 corresponding to the minimum height 116 of the elongate structure 102. In some examples, the web height 124 of the web 120 is, or defines, the maximum web height 134 at one or more locations along the length 114 of the elongate structure 102 corresponding to the maximum height 118 of the elongate structure 102.

In some examples, the elongate structure 102 also includes the lower flange 122. The lower flange 122 extends from the web 120. The lower flange 122 is operatively coupled with the panel structure 108. The lower flange 122 has the lower flange width 144. In some examples, the lower flange width 144 varies along at least a portion of the length 114 of the elongate structure 102. In some examples, the elongate structure 102 also includes the upper flange 128. The upper flange 128 extends from the web 120. The upper flange 128 is opposite the lower flange 122. The upper flange 128 has the upper flange width 146. In some examples, the upper flange varies along at least a portion of the length 114 of the elongate structure 102. In some examples, the lower flange width 144 is a minimum lower flange width at the opening 206 of the support structure 104. In some examples, the upper flange width 126 is a minimum upper flange width at the opening 206 of the support structure 104.

As disclosed herein, the structural assembly 100 that includes the elongate structure 102 having the variable mass 238 and/or the variable volume 274 achieved via localized variations in at least one of the height 110 of the elongate structure 102, the width 244 of the elongate structure 102, the web height 124 of the web 120, and/or the web thickness 254 of the web 120 may provide a variety of advantages. As an example, the variable height 110 of the elongate structure 102, or the variable web height 124 of the web 120 (e.g., providing a taller web 120 along some sections of the elongate structure 102 and a shorter web along other sections of the elongate structure 102) and/or the variable web thickness 254 of the web 120 (e.g., providing a wider web 120 along some sections of the elongate structure 102 and a thinner web 120 along other sections of the elongate structure 102) may provide for variable stability and variable load bearing capacity where required along the length 114 of the elongate structure 102. As another example, the elongate structure 102 with the variable height 110, or the web 120 with the variable web height 124, and/or the variable web thickness 254 of the web 120 may provide a more favorable strength to weight ratio in comparison to traditional stiffener or stringer design. As another example, the variable height 110 of the elongate structure 102, or the variable web height 124 of the web 120, and/or the variable web thickness 254 of the web 120 may reduce the total number of elongate structures 102 required for certain structural assemblies 100 (e.g., reduce the number of stringers used in certain aircraft assemblies, such as the fuselage and/or wings) in order to reduce the overall weight and assembly time of the structural assembly 100. As another example, the variable height 110 of the elongate structure 102, or the variable web height 124 of the web 120, and/or the variable web thickness 254 of the web 120 may enable the geometry of the elongate structure 102 to be tailored so as to be able to adequately withstand different types and varying types of loads that the elongate structure 102 will undergo along the length 114 of the elongate structure 102, so as to minimize the amount of structure material and therefore the weight of the elongate structure 102.

As another example, a taller portion of the web 120 and/or a thicker portion of the web 120 may be provided between adjacent support structures 104 or at the mid-bay location (e.g., the location 112). At the mid-bay location, this is where an increased stability may be needed along the length 114 of the elongate structure 102. As another example, a shorter portion of the web 120 and/or a thinner portion of the web 120 may be provided at the intersection of the elongate structure 102 and the support structure 104, such as within the opening 206 (or the opening 226) where the elongate structure 102 passes through the support structure 104. At the opening 206, this is where a decreased stability may be allowable along the length 114 of the elongate structure 102. As such, the varying height 110 of the elongate structure 102, or varying the web height 124 of the web 120, and/or the varying web thickness 254 of the web 120 may be tailored to support different loads that the elongate structure 102 may experience over the length 114 of the elongate structure 102. Generally, the locations of the minimum height 116 of the elongate structure 102, the minimum web height 132 of the web 120, the minimum web thickness 270 of the web 120, the maximum height 118 of the elongate structure 102, the maximum web height 134 of the web 120, and the maximum web thickness 272 of the web 120 is driven by the strength needed to prevent buckling of the elongate structure 102, such as in response to a compression load.

As another example, providing a taller portion of the web 120 and/or a thicker portion of the web 120 between adjacent support structures 104 may enable greater spacing between adjacent support structures 104 and/or less support structures 104, thus reducing the cost and weight of the structural assembly 100. As another example, providing a shorter portion of the web 120 and/or a thinner portion of the web 120 within the opening 206 (or the opening 226) may enable the opening 206 (or the opening 226) to be smaller (e.g., thinner, and/or shorter). This smaller opening 206 may enable a reduction in the overall height and/or thickness of the support structure 104 or enable use of a shorter support structure 104 that provides sufficient fail safety requirements.

The structural assembly 100 having the elongate structure 102 with the variable flange widths may also provide a variety of advantages. As an example, providing wider flange portions along some sections of the flange and narrower flange portions along other sections of the flange may provide a more favorable strength to weight ratio in comparison to traditional stiffener or stringer design and may enable the geometry of the elongate structure 102 to be tailored so as to be able to adequately withstand different types and varying types of loads that the elongate structure 102 will undergo along the length 114 of the elongate structure 102, so as to minimize the amount of structure material and therefore the weight of the elongate structure 102. As another example, wider flange portions may be provided between adjacent support structures 104 or at the mid-bay location. At this mid-bay location, this is where an increased stability may be needed along the length 114 of the elongate structure 102. As such, the varying width of the flange portions may be tailored to support different loads that the elongate structure 102 may experience over the length 114 of the elongate structure 102.

Figure 18:
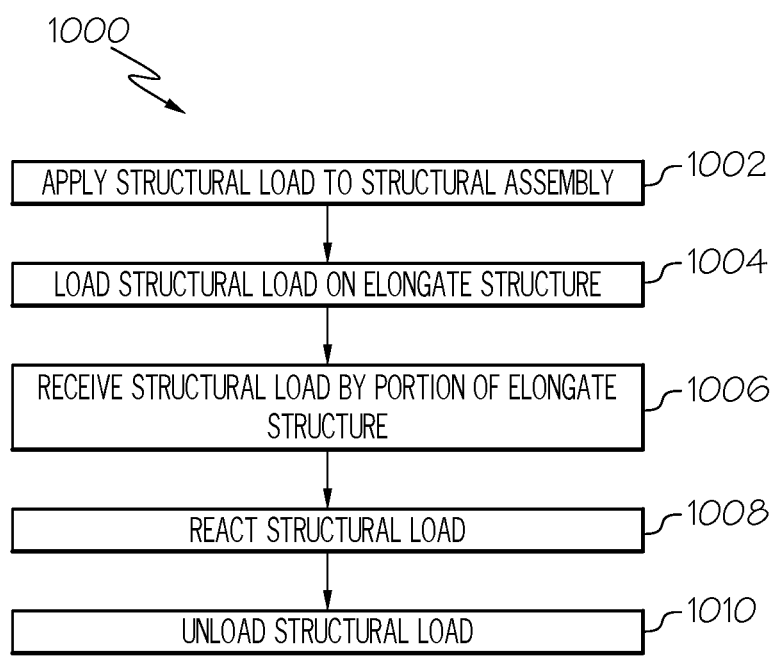
FIG. 18 is a flow diagram of an example of a method for supporting a structural load in a structural assembly.

FIG. 18 illustrates a flow diagram of an example of a method 1000 for supporting a structure load in the structural assembly 100. In some examples, the structural assembly 100 includes the support structure 104 and the elongate structure 102 intersecting the support structure 104. In some examples, the structural assembly 100 includes the panel structure 108, the support structure 104 coupled to the panel structure 108, and the elongate structure 102 coupled to the panel structure 108 and intersecting the support structure 104. In some examples, the structural assembly 100 includes the plurality of support structures 104 and the plurality of elongate structures 102 extending between adjacent ones of the support structures 104.

In accordance with the examples of the structural assembly 100 and the elongate structure 102, the method 1000 provides for supporting the structural load by the elongate structure 102 and/or increasing the structural load capacity of the elongate structure 102. In some examples, the method 1000 provides for supporting the structural load on the structural support 100 and/or increasing the structural load capacity of the structural support 100, where the structural load resides on the elongate structure 102. In some examples, the method 1000 provides for supporting the structural load by the structure 232 and/or increasing the structural load capacity of the structure 232, where the structural load resides on the structural assembly 100, such as the elongate structure 102 of the structural assembly 100.

In some examples, the structural load may reside on the elongate structure 102 including the web 120 extending along the length 114 of the elongate structure 102 and the lower flange 122. In some examples, the structural load may reside along the web 120. The web 120 has the variable web height 124 and/or the variable web thickness 254 along at least a portion of the length 114 of the elongate structure 102.

In some examples, the method 1000 includes applying the structural load to the structural assembly 100 (Block 1002). In an example, the structural load is a compressive load applied to one or more portions of the structural assembly 100 of the structure 232. In an example, application of the structural load is in response to operation of the vehicle structure 234 (e.g., the aircraft 1200) or utilization of the stand-alone structure 236. In an example, operation or utilization of the structure 232 applies a pressure or force and, therefore, the structural load to the structural assembly 100, such as to the elongate structure 102 and the support structure 104 coupled to the panel structure 108.

In some examples, the method 1000 includes a step of loading the structural load onto the elongate structure 102 (Block 1004). In some examples, the elongate structure 102 has the mass 238 that varies along at least a portion of a length 114 of the elongate structure 102. The localized mass 240 of the elongate structure 102 decreases toward the support structure 104 and increases away from the support structure 104. In some examples, the elongate structure 102 has the height 110 that varies along at least a portion of the length 114 of the elongate structure 102. The height 110 of the elongate structure 102 decreases proximate to the support structure 104 and increases from the support structure 104 to the location 112 that is spaced away from the support structure 104.

Generally, in response to operation or utilization of the structure 232, the method 1000 generates forces configured to apply the structural load to certain portions of the elongate structure 102. In accordance with the method 1000, in some examples, in response to loading, the structural load is received by at least a portion of the elongate structure 102 (Block 1006). In some examples, the elongate structure 102 includes the web 120 extending the length 114 of the elongate structure 102. The web 120 has the web height 124 and the web thickness 254. At least one of the web height 124 and the web thickness 254 varies along the length 114 of the elongate structure 102. A decrease in at least one of the localized web height 252 and the localized web thickness 256 of the web 120 corresponds to a decrease in at least one of the localized mass 240 and/or the localized volume 276 of the elongate structure 102. An increase in at least one of the localized web height 252 and the localized web thickness 256 of the web 120 corresponds to an increase in at least one of the localized mass 240 and/or the localized volume 276 of the elongate structure 102. In response to loading, the structural load is received by at least a portion of the elongate structure 102 having a maximum mass 268. In some examples, the height 110 of the elongate structure 102 is the minimum height 116 proximate to the support structure 104 and the height 110 of the elongate structure 102 is the maximum height 118 at the location 112 that is spaced away from the support structure 104. In response to loading, the structural load is received by at least a portion of the elongate structure 102 having the maximum height 118 (Block 1006).

In response to operation or utilization of the structure 323, the method 1000 generates forces configured to apply the structural load to certain portions of the elongate structure 102, such as along the web 120 of the elongate structure 102. In some examples, the elongate structure 102 includes the web 120 having the web height 124 that at least partially defines the height 110 of the elongate structure 102 and the web thickness 254. The web height 124 of the web 120 and/or the web thickness 254 of the web 120 varies along at least a portion of the length 114 of the elongate structure 102. The elongate structure 102 also includes the lower flange 122 that extends from the web 120 and that is coupled to the panel structure 108. In some examples, the step of loading the structural load onto the elongate structure 102 includes a step of receiving at least a portion of the structural load in at least the web 120 of the elongate structure 102.

In some examples, the elongate structure 102 passes through the opening 206 (or the opening 226) provided by the support structure 104. In some examples, at least one of the web height 124 of the web 120 is the minimum web height 132 and/or the web thickness 254 of the web 120 is the minimum web thickness 270 within the opening 206. At least one of the web height 124 of the web 120 is the maximum web height 134 and/or the web thickness 254 of the web 120 is the maximum web thickness 272 at the location 112 that is spaced away from the support structure 104. In accordance with the method 1000, in some examples, in response to loading, at least a portion of the structural load is received by at least a portion of the web 120 having the maximum web height 134 and/or the maximum web thickness 272.

In accordance with the method 1000, in some examples, the forces that generate the structural load are in a direction generally perpendicular to the web 120 of the elongate structure 102. In an example, such loading may occur along various portions of the elongate structure 102, particularly along portions of the length 114 of the elongate structure 102 located between the first frame structural 104A and the second support structure 104B (e.g., at a mid-bay location). In some examples, the structural load may vary along the length 114 of the elongate structure 102. In such a situation, a portion of the length 114 of the elongate structure 102 that receives the majority of the load is fabricated to have the maximum height 118, the maximum web height 134 of the web 120, and/or the maximum web thickness 272 of the web 120. In other words, the height 110 of the elongate structure 102, the web height 124 of the web 120, and/or the web thickness 254 of the web 120 may vary with the structural load along the length 114 of the elongate structure 102. In some examples, the structural load may be greater along a first section of the elongate structure 102, or along a first portion of the length 114, having an increased mass 238 (e.g., maximum mass 268) and/or an increased volume 274 (e.g., maximum volume 280) than along a second section of the elongate structure 102, or along a second portion of the length 114, having a decreased mass 238 (e.g., minimum mass 266) and/or a decreased volume 274 (e.g., minimum volume 278). In some examples, the structural load may be greater along a first section of the elongate structure 102, or along a first portion of the length 114, having an increased height 110 (e.g., maximum height 118), an increased web height 124 (e.g., maximum web height 134), and/or an increased web thickness 254 (e.g., maximum web thickness 272) than along a second section of the elongate structure 102, or along a second portion of the length 114, having a decreased height 110 (e.g., minimum height 116), a decreased web height 124 (e.g., minimum web height 132), and/or a decreased web thickness 254 (e.g., minimum web thickness 270).

In accordance with the method 1000, in some examples, the method 1000 also includes a step of varying the structural load over the length 114 of the elongate structure 102. In an example, the structural load increases along a portion of the elongate structure 102 having the maximum height 118, the maximum web height 134, and/or the maximum web thickness 272 (e.g., the maximum mass 268 and/or the maximum volume 280) and the structural load decreases along a portion of the elongate structure 102 having the minimum height 116, the minimum web height 132, and/or the minimum web thickness 270 (e.g., the minimum mass 266 and/or the minimum volume 278).

In some example, the method 1000 includes a step of reacting the structural load in response to the loading to resist a bending moment (Block 1008). In some examples, this step includes a step of reacting the load along the variable web height 124 of the web 120 and/or the variable web thickness 254 of the web 120 provided along at least a portion of the elongate structure 102 having the maximum height 118, the maximum web height 134 of the web 120, and/or the maximum web thickness 272 such as the portion of the elongate structure 102 located between the adjacent support structures 104. In such a situation, the portion of the elongate structure 102 having the maximum height 118, the maximum web height 134, and/or the maximum web thickness 272 resists buckling of the elongate structure 102 between the adjacent support structures 104.

In some examples, the method 1000 also includes a step of unloading the structural load on the elongate structure 102 (Block 1010). In some examples, this step includes a step of unloading the load along the variable height 110 of the elongate structure 102, the variable web height 124 of the web 120, and/or the variable web thickness 254 of the web 120 provided along at least a portion of the elongate structure 102 where the elongate structure 102 intersects the support structure 104, such as where the elongate structure 102 passes through the opening 206 provided by the support structure 104. Alternatively, or in addition to, this step may include a step of unloading the structural load proximate to (e.g., at or near) the mounting clip 216 that operatively couples the mounting surface 218 of the elongate structure 102 to the planar surface 214 of the support structure 104.

Figure 19:
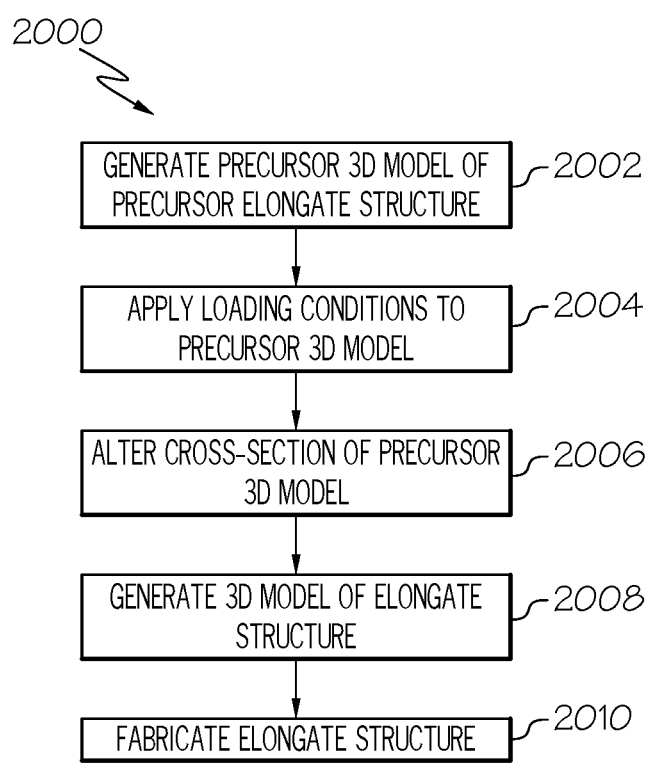
FIG. 19 is a flow diagram of an example of a method for fabricating an elongate structure.
Figure 20:
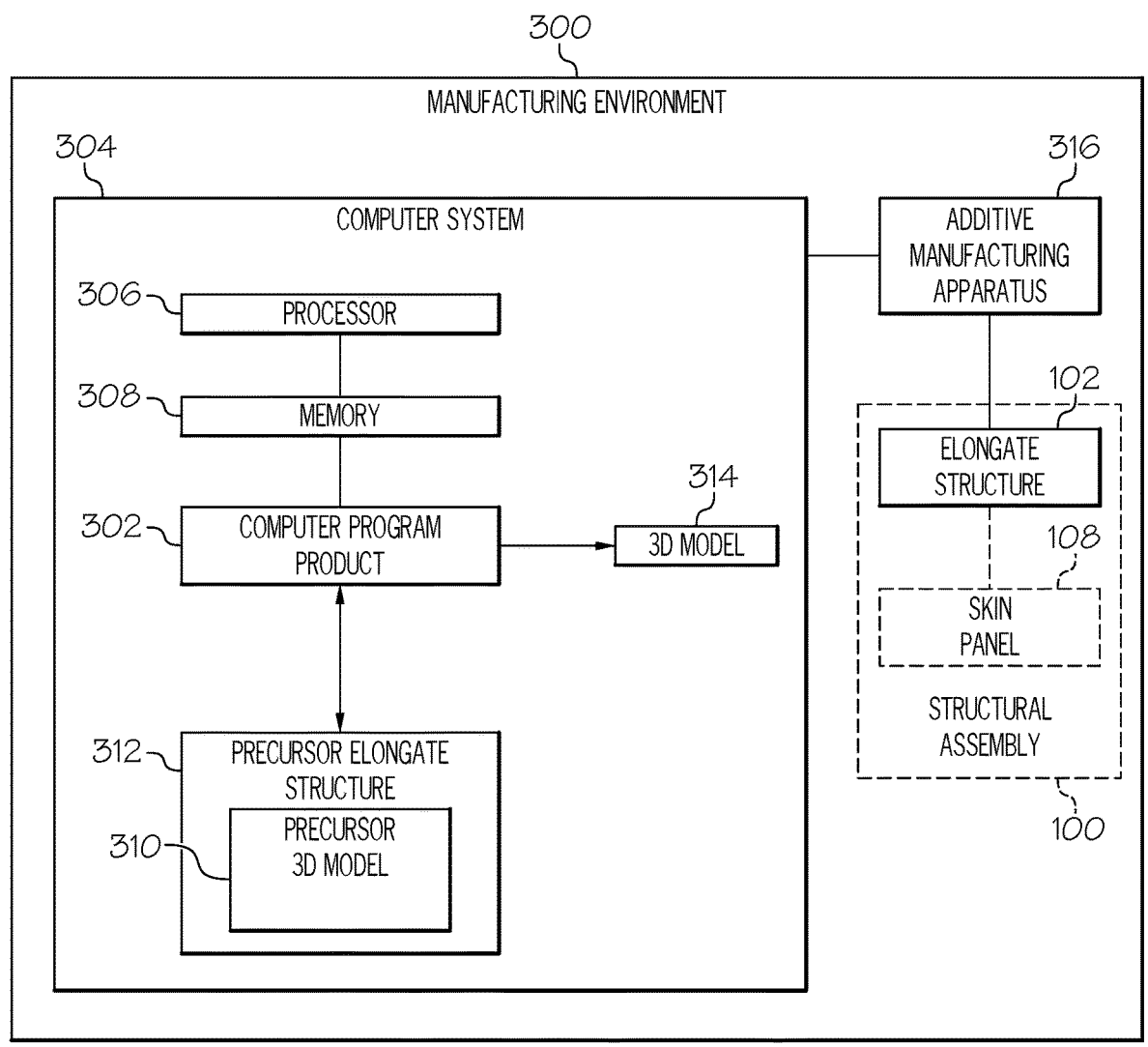
FIG. 20 is a schematic block diagram of an example of a manufacturing environment.

FIG. 19 illustrates a flow diagram of an example of a method 2000 for fabricating the elongate structure 102 of the structural assembly 100. FIG. 20 illustrates an example of a manufacturing environment 300 utilized to design and fabricate the elongate structure 102.

As described herein above, the elongate structure 102 is designed and fabricated having the mass 238 and/or volume 274 that varies along at least a portion of the length 114. In some examples, the variable mass 238 and/or variable volume 274 is achieved by designing and fabricating the elongate structure 102 having the height 110 that varies along at least a portion of the length 114, the web 120 having the web height 124 that varies along at least a portion of the length 114, and/or the web 120 having the web thickness 254 that varies along at least a portion of the length 114. Additionally, in some examples, the variable mass 238 and/or variable volume 274 is achieved by designing and fabricating the elongate structure 102 with the lower flange 122 having the lower flange width 144 that varies along at least a portion of the length 114 and/or the upper flange 128 having the upper flange width 146 that varies along at least a portion of the length 114. In accordance with the method 2000, the variable height 110 of the elongate structure 102, the variable web height 124 of the web 120, the variable web thickness 254, and/or the variable lower flange width 144 and/or upper flange width 146 may be selected based on the loading requirements of the elongate structure 102. In other words, the material composition and geometry of the elongate structure 102 may be optimized to balance the size, shape, and weight of the elongate structure 102 and the space requirements of the structural assembly 100 with the loads applied to the structural assembly 100. In some examples, the maximum heights 118 of the elongate structure 102, the maximum web heights 134 of the web 120, and/or the maximum web thicknesses 272 of the web 120 are selected at locations along the length 114 of the elongate structure 102 in which buckling in response to the loading is most likely to occur, such as at the location 112 between the adjacent support structures 104. Similarly, the minimum heights 116 of the elongate structure 102, the minimum web heights 132 of the web 120, and/or the minimum web thicknesses 270 of the web 120 are selected at locations along the length 114 of the elongate structure 102 in which buckling in response to the loading is least likely to occur, such as proximate to the support structures 104. Such selective locations of the minimum heights 116, the minimum web heights 132, the minimum web thicknesses 270, the maximum heights 118, the maximum web heights 134, and maximum web thicknesses 272 of the elongate structure 102 beneficially enable optimization of material used to manufacture the elongate structure 102 and strength-to-weight requirements sufficient to react to the loads applied to the structural assembly 100 by only placing material where it is needed to support the structural loads.

Referring to FIG. 20, in some examples, optimized design of the elongate structure 102 is performed using a computer program product 302 executed on a computer system 304 (e.g., one or more computers). The computer system 304 includes at least one processor 306 and memory 308, such as a non-transitory computer readable medium. The computer program product 302 includes computer code stored on the memory 308 and executable by the processor 306 to perform operational steps in accordance with the disclosed method 2000. Generally, the computer system 304 provides an operating environment for execution of at least a portion of the steps of the method 2000. For example, the method 2000 may be implemented by one computer or in several interconnected computers. The computer system 304 may include any collection of computing devices that individually or jointly execute a set (or multiple sets) of instructions to implement any one or more of the operations discussed herein. Any type of computer system 304 or other apparatus adapted for carrying out the methods described herein may be utilized. A typical combination of hardware and software may be a general-purpose computer system. The general-purpose computer system may include computer programs, such as the computer program product 302, that control the computer system 304 such that it carries out the operational steps described herein.

In some examples, implementation of the method 2000 may take the form of the computer program product 302 on a computer-usable storage medium (e.g., a hard disk, a CD-ROM, solid state memory, or the like). The computer-usable storage medium may include computer-usable program code embodied thereon. For the purpose of this disclosure, the term "computer program product" may refer to a device including features enabling the implementation of the methods described herein. The terms computer program, software application, computer software routine, and/or other variants of these terms may mean any expression, in any language, code, or notation, of a set of instructions intended to cause a computing system having information processing capability to perform a particular function either directly or after either or both of the following: a) conversion to another language, code, or notation; or b) reproduction in a different material form. Instructions may be referred to as program code, computer usable program code, or computer readable program code that may be read and executed by the processor 306. The program code, in the different examples, may be embodied on different physical or computer readable storage media, such as the memory 308.

Referring to FIG. 19, in some examples, the method 2000 includes a step of generating a virtual representation of a precursor elongate structure 312, referred to herein as a precursor three-dimensional model 310 (Block 2002). The precursor three-dimensional model 310 is generated using the computer program product 302, which includes instructions executed by the computer system 304.

The precursor elongate structure 312 represented by the precursor three-dimensional model 310 includes the features of the elongate structure 102, such as at least a lower flange and a web and, optionally, an upper flange. The precursor three-dimensional model 310 has a constant cross-sectional geometry. In other words, the lower flange of the precursor three-dimensional model 310 has a lower flange width that is constant along the length of the precursor elongate structure 312 and a web height that is constant along the length of the precursor elongate structure 312 and, optionally, an upper flange width that is constant along the length of the precursor elongate structure 312.

In some examples, the method 2000 includes a step of applying a loading condition to the precursor three-dimensional model 310 (Block 2004). In some examples, the loading condition includes a plurality of virtual forces that are applied to nodes of the precursor three-dimensional model 310, which represent the loads (e.g., compression loads) that will be applied to the structural assembly 100 or to the elongate structure 102. The loading condition is applied to the precursor three-dimensional model 310 using the computer program product 302, which includes instructions executed by the computer system 304.

In some examples, the method 2000 includes a step of altering the cross-sectional geometry of the precursor three-dimensional model 310 (Block 2006). Alteration of the cross-section of the precursor three-dimensional model 310 is based on the locations along the length of the precursor three-dimensional model 310 where reaction to the loads is most likely. In some examples, the height of the precursor three-dimensional model 310, the web height of the web, and/or the web thickness of the web is increased along portions of the length of the precursor elongate structure 312 where buckling is response to loading is most likely. In some examples, the height of the precursor three-dimensional model 310, the web height of the web, and/or the web thickness of the web is decreased along portions of the length of the precursor elongate structure 312 where buckling is response to loading is least likely.

In some examples, the method 2000 includes a step of generating a virtual representation of the elongate structure 102, referred to herein as a three-dimensional model 314 (Block 2008). The three-dimensional model 314 is generated based on the altered cross-sectional geometry generated in response to the loading conditions. The three-dimensional model 314 is generated using the computer program product 302, which includes instructions executed by the computer system 304.

In some examples, the method 2000 includes a step of fabricating the elongate structure 102 (Block 2010). The elongate structure 102 includes the lower flange 122 having the lower flange width 144 that varies along at least a portion of the length 114 of the elongate structure 102 corresponding to the lower flange width of the precursor three-dimensional model 310 generated in response to the loading conditions. The elongate structure 102 includes the web 120 having the web height 124 and/or a web thickness 254 that varies along at least a portion of the length 114 of the elongate structure 102 corresponding to the web height and the web thickness of the precursor three-dimensional model 310 generated in response to the loading conditions. Optionally, the elongate structure 102 also includes the upper flange 128 having the upper flange width 146 that varies along at least a portion of the length 114 of the elongate structure 102 corresponding to the upper flange width of the precursor three-dimensional model 310 generated in response to the loading conditions.

In accordance with the method 2000, the locations along the length 114 of the elongate structure 102 in which the maximum mass 268 and/or the maximum volume 280 reside and the locations along the length 114 of the elongate structure 102 in which the minimum mass 266 and/or the minimum volume 278 reside are selectively designated in response to the loading conditions applied to the structural assembly 100. In some examples, the locations along the length 114 of the elongate structure 102 in which the maximum height 118, the maximum web height 134, and/or the maximum web thickness 272 reside and the locations along the length 114 of the elongate structure 102 in which the minimum height 116, the minimum web height 132, and/or the minimum web thickness 270 reside are selectively designated in response to the loading conditions applied to the structural assembly 100.

Referring to FIG. 20, in some examples, the elongate structure 102 is fabricated using an additive manufacturing apparatus 316. In some examples, the additive manufacturing apparatus 316 builds the elongate structure 102 by adding layer-upon-layer of a feed material, such as metal. The additive manufacturing apparatus 316 fabricates the elongate structure 102 based on the three-dimensional model 314. In such examples, the elongate structure 102 is a monolithic structure. In some examples, the additive manufacturing apparatus 316 builds the structural assembly 100, for example, including the panel structure 108 and the elongate structure 102, and, optionally, the support structure 104, by adding layer-upon-layer of a feed material, such as metal. The additive manufacturing apparatus 316 fabricates the structural assembly 100 based on the three-dimensional model 314. In such examples, the structural assembly 100 is a monolithic structure.

Figure 21:
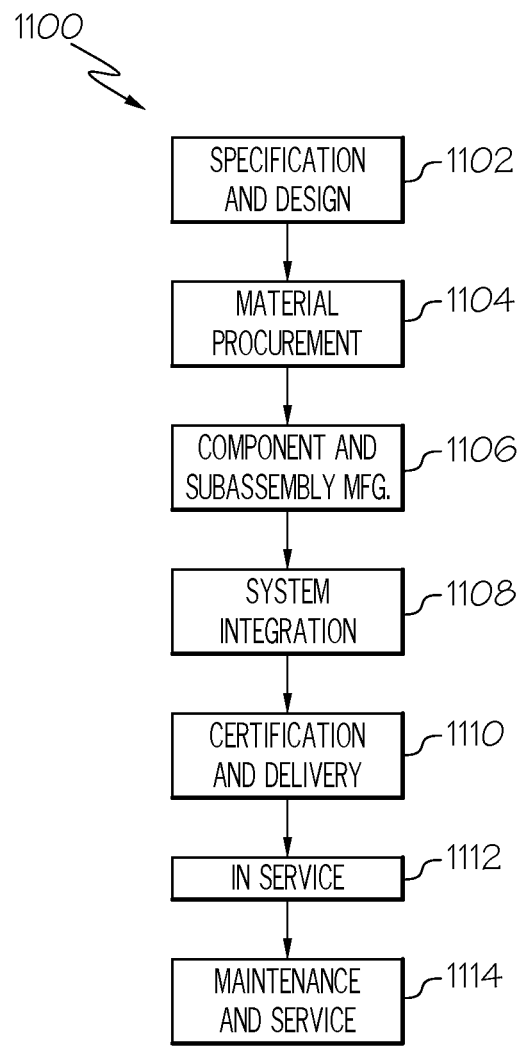
FIG. 21 is a flow diagram of an example aircraft production and service methodology.

Examples of the structural assembly 100, the elongate structure 102, and methods 1000 and 2000 disclosed herein may find use in a variety of potential applications, particularly in the transportation industry, including for example, aerospace applications. Referring now to FIGS. 4 and 21, examples of the structural assembly 100, the elongate structure 102, and methods 1000 and 2000 may be used in the context of an aircraft manufacturing and service method 1100, as shown in the flow diagram of FIG. 21, and the aircraft 1200, as shown in FIG. 4. Aircraft applications of the disclosed examples may include fabrication of structural assemblies having elongate structures that form the fuselage, wings, or other components used in the manufacture of aircraft.

As shown in FIG. 21, during pre-production, the illustrative method 1100 may include specification and design of aircraft 1200 (Block 1102) and material procurement (Block 1104). During production of the aircraft 1200, component and subassembly manufacturing (Block 1106) and system integration (Block 1108) of the aircraft 1200 may take place. Thereafter, the aircraft 1200 may go through certification and delivery (Block 1110) to be placed in service (Block 1112). The disclosed structural assembly 100, the elongate structure 102, and methods 1000 and 2000 may form a portion of component and subassembly manufacturing (Block 1106) and/or system integration (Block 1108). Routine maintenance and service (Block 1114) may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the structural assembly 100, the elongate structure 102, and methods 1000 and 2000 shown or described herein may be employed during any one or more of the stages of the manufacturing and service method 1100 shown in the flow diagram illustrated by FIG. 21. For example, components or subassemblies, such as those that include the elongate structure 102, corresponding to component and subassembly manufacturing (Block 1106) may be fabricated or manufactured in a manner similar to components or subassemblies produced while the aircraft 1200 is in service (Block 1112). Also, one or more examples of the structural assembly 100, the elongate structure 102, and methods 1000 and 2000, or combinations thereof may be utilized during production stages (Blocks 1108 and 1110). Similarly, one or more examples of the structural assembly 100, the elongate structure 102, and methods 1000 and 2000, or a combination thereof, may be utilized, for example and without limitation, while the aircraft 1200 is in service (Block 1112) and during maintenance and service stage (Block 1114).

Although an aerospace example is shown, the principles disclosed herein may be applied to other industries, such as the automotive industry, the space industry, the construction industry, and other design and manufacturing industries. Accordingly, in addition to aircraft, the principles disclosed herein may apply to other vehicle structures 234, (e.g., land vehicles, marine vehicles, space vehicles, etc.) and stand-alone structures 236.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIGS. 1 and 20 referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 20 may be combined in various ways without the need to include other features described in FIGS. 1 and 20, other drawing figures, and/or the accompanying disclosure, even though such combination or combinations are not explicitly illustrated herein. Similarly, additional features not limited to the examples presented, may be combined with some or all of the features shown and described herein.

In FIGS. 18, 19, and 21, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 18, 19, and 21 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed structural assembly, elongate structure, and methods have been shown and described, modifications may occur to those skilled in the art upon reading the specification. The present application includes such modifications and is limited only by the scope of the claims.

What is claimed is:

1. A structural assembly (100), comprising:
    a support structure (104A), comprising:
        a first side;
        a second side, opposite the first side; and
        an opening (206), extending from the first side to the second side;
    an elongate structure (102) that passes through the opening (206) in the support structure (104A), the elongate structure (102) comprising:
        a web (120); and
        a lower flange (122), extending from the web (120); and
    a panel structure (108), coupled to the lower flange (122) of the elongate structure (102),
    wherein:
        a first virtual cross-section of the elongate structure (102) is spaced away from the first side of the support structure (104);
        the first side of the support structure (104A) faces toward the first virtual cross-section, and the second side of the support structure (104A) faces away from the first virtual cross-section;
        a second virtual cross-section of the elongate structure (102) is spaced away from the second side of the support structure (104A);
        the second side of the support structure (104A) faces toward the second virtual cross-section, and the first side of the support structure (104A) faces away from the second virtual cross-section;
        a third virtual cross-section of the elongate structure (102) is in the opening (206) of the support structure (104A);
        the web (120) has a first height at the first virtual cross-section of the elongate structure (102);
        the web (120) has a second height at the second virtual cross-section of the elongate structure (102);
        the web (120) has a third height at the third virtual cross-section of the elongate structure (102);
        the third height of the web (120) is smaller than the first height of the web (120);
        the third height of the web (120) is smaller than the second height of the web (120);
        the lower flange (122) has a first width at the first virtual cross-section of the elongate structure (102);
        the lower flange (122) has a second width at the second virtual cross-section of the elongate structure (102);
        the lower flange (122) has a third width at the third virtual cross-section of the elongate structure (102);
        the third width of the lower flange (122) is smaller than the first width of the lower flange (122); and
        the third width of the lower flange (122) is smaller than the second width of the lower flange (122).

2. The structural assembly (100) of claim 1, wherein:
    the first virtual cross-section of the elongate structure (102) has a first area;
    the second virtual cross-section of the elongate structure (102) has a second area;
    the third virtual cross-section of the elongate structure (102) has a third area;

the third area of the elongate structure (102) is smaller than the first area of the elongate structure (102); and the third area of the elongate structure (102) is smaller than the second area of the elongate structure (102).

3. The structural assembly (100) of claim 1, wherein:

the web (120) has a minimum height and a maximum height;

the third height of the web (120) is equal to the minimum height of the web (120); and at least one of the first height and the second height of the web (120) is equal to the maximum height of the web (120).

4. The structural assembly (100) of claim 1, wherein:

the opening (206) in the support structure (104A) has a height; and the height of the opening (206) is smaller than at least one of the first height and the second height of the web (120) of the elongate structure (102).

5. The structural assembly (100) of claim 1, further comprising a second support structure (104B), spaced away from the support structure (104A), wherein the second support structure (104B) comprises:

a third side;

a fourth side, opposite the third side; and a second opening, extending from the third side to the fourth side, wherein:

the elongate structure (102) passes through the second opening in the second support structure (104B);

the second virtual cross-section of the elongate structure (102) is spaced away from the third side of the second support structure (104B);

the third side of the second support structure (104B) faces toward the second virtual cross-section;

the fourth side of the second support structure (104B) faces away from the second virtual cross-section;

a fourth virtual cross-section of the elongate structure (102) is spaced away from the fourth side of the second support structure (104B);

the fourth side of the second support structure (104B) faces toward the fourth virtual cross-section;

the third side of the second support structure (104B) faces away from the fourth virtual cross-section;

a fifth virtual cross-section of the elongate structure (102) is in the second opening of the second support structure (104B);

the web (120) has a fourth height at the fourth virtual cross-section of the elongate structure (102);

the web (120) has a fifth height at the fifth virtual cross-section of the elongate structure (102);

the fifth height of the web (120) is smaller than the second height of the web (120); and the fifth height of the web (120) is smaller than the fourth height of the web (120).

6. The structural assembly (100) of claim 1, wherein the lower flange (122) extends from the web (120) along an entirety of the elongate structure (102).

7. The structural assembly (100) of claim 1, wherein:

the web (120) has a first thickness at the first virtual cross-section of the elongate structure (102);

the web (120) has a second thickness at the second virtual cross-section of the elongate structure (102);

the web (120) has a third thickness at the third virtual cross-section of the elongate structure (102);

the third thickness of the web (120) is smaller than the first thickness of the web (120); and the third thickness of the web (120) is smaller than the second thickness of the web (120).

8. The structural assembly (100) of claim 7, wherein:

the first virtual cross-section of the elongate structure (102) has a first area;

the second virtual cross-section of the elongate structure (102) has a second area;

the third virtual cross-section of the elongate structure (102) has a third area;

the third area of the elongate structure (102) is smaller than the first area of the elongate structure (102); and the third area of the elongate structure (102) is smaller than the second area of the elongate structure (102).

9. The structural assembly (100) of claim 1, wherein the elongate structure (102) further comprises an upper flange (128), extending from the web (120), opposite the lower flange (122), wherein:

the upper flange (128) has a first width at the first virtual cross-section of the elongate structure (102);

the upper flange (128) has a second width at the second virtual cross-section of the elongate structure (102);

the upper flange (128) has a third width at the third virtual cross-section of the elongate structure (102);

the third width of the upper flange (128) is smaller than the first width of the upper flange (128); and the third width of the upper flange (128) is smaller than the second width of the upper flange (128).

10. The structural assembly (100) of claim 9, wherein:

the upper flange (128) has a minimum width and a maximum width;

the third width of the upper flange (128) is equal to the minimum width of the upper flange (128); and at least one of the first width and the second width of the upper flange (128) is equal to the maximum width of the upper flange (128).

11. The structural assembly (100) of claim 1, wherein the elongate structure (102) is a monolithic structure.

12. The structural assembly (100) of claim 1, wherein:

the elongate structure (102) is coupled to the support structure (104A); and the panel structure (108) is coupled to the support structure (104A).

13. The structural assembly (100) of claim 1, wherein:

the support structure (104A) is a frame of an aircraft (1200);

the elongate structure (102) is a stringer of the aircraft (1200); and the panel structure (108) is a skin panel of the aircraft (1200).

14. The structural assembly (100) of claim 1, wherein:

the lower flange (122) has a minimum width and a maximum width;

the third width of the lower flange (122) is equal to the minimum width of the lower flange (122); and at least one of the first width and the second width of the lower flange (122) is equal to the maximum width of the lower flange (122).

15. An elongate structure (102) for a structural assembly (100), the elongate structure (102) comprising:

a web (120);

a lower flange (122), extending from the web (120);

a first virtual cross-section;

a second virtual cross-section, spaced away from the first virtual cross-section; and a third virtual cross-section between the first virtual cross-section and the second virtual cross-section, wherein:
the web (120) has a first height at the first virtual cross-section of the elongate structure (102);
the web (120) has a second height at the second virtual cross-section of the elongate structure (102);
the web (120) has a third height at the third virtual cross-section of the elongate structure (102);
the third height of the web (120) is smaller than the first height of the web (120);
the third height of the web (120) is smaller than the second height of the web (120);
the lower flange (122) has a first width at the first virtual cross-section of the elongate structure (102);
the lower flange (122) has a second width at the second virtual cross-section of the elongate structure (102);
the lower flange (122) has a third width at the third virtual cross-section of the elongate structure (102);
the third width of the lower flange (122) is smaller than the first width of the lower flange (122); and
the third width of the lower flange (122) is smaller than the second width of the lower flange (122).

16. The elongate structure (102) of claim 15, wherein:
the first virtual cross-section of the elongate structure (102) has a first area;
the second virtual cross-section of the elongate structure (102) has a second area;
the third virtual cross-section of the elongate structure (102) has a third area;
the third area of the elongate structure (102) is smaller than the first area of the elongate structure (102); and
the third area of the elongate structure (102) is smaller than the second area of the elongate structure (102).

17. The elongate structure (102) of claim 15, wherein:
the web (120) has a first thickness at the first virtual cross-section of the elongate structure (102);
the web (120) has a second thickness at the second virtual cross-section of the elongate structure (102);
the web (120) has a third thickness at the third virtual cross-section of the elongate structure (102);
the third thickness of the web (120) is smaller than the first thickness of the web (120); and
the third thickness of the web (120) is smaller than the second thickness of the web (120).

18. A method for supporting a load in a structural assembly (100), comprising a support structure (104A), an elongate structure (102), and a panel structure (108), the method comprising steps of:
coupling the support structure (104A) to the panel structure (108), wherein the support structure (104A) comprises:
a first side;
a second side, opposite the first side; and
an opening (206), extending from the first side to the second side;
coupling the elongate structure (102) to the panel structure (108) such that the elongate structure (102) passes through the opening (206) in the support structure (104A), wherein the elongate structure comprises:
a web (120); and
a lower flange (122), extending from the web (120);
applying the load to the panel structure (108);
transferring the load from the panel structure (108) to the elongate structure (102);
reacting the load in the web (120) to resist a bending moment in the elongate structure (102); and
removing the load from the panel structure (108),
wherein:
a first virtual cross-section of the elongate structure (102) is spaced away from the first side of the support structure (104A);
the first side of the support structure (104A) faces toward the first virtual cross-section, and the second side of the support structure (104A) faces away from the first virtual cross-section;
a second virtual cross-section of the elongate structure (102) is spaced away from the second side of the support structure (104A);
the second side of the support structure (104A) faces toward the second virtual cross-section, and the first side of the support structure (104A) faces away from the second virtual cross-section;
a third virtual cross-section of the elongate structure (102) is in the opening (206) of the support structure (104A);
the web (120) has a first height at the first virtual cross-section of the elongate structure (102);
the web (120) has a second height at the second virtual cross-section of the elongate structure (102);
the web (120) has a third height at the third virtual cross-section of the elongate structure (102);
the third height of the web (120) is smaller than the first height of the web (120) and the second height of the web (120);
the lower flange (122) has a first width at the first virtual cross-section of the elongate structure (102);
the lower flange (122) has a second width at the second virtual cross-section of the elongate structure (102);
the lower flange (122) has a third width at the third virtual cross-section of the elongate structure (102);
the third width of the lower flange (122) is smaller than the first width of the lower flange (122); and
the third width of the lower flange (122) is smaller than the second width of the lower flange (122).

19. The method of claim 18, wherein:
the load is received at least by a first portion of the elongate structure (102) and a second portion of the elongate structure (102);
the first portion of the elongate structure (102) contains the first virtual cross-section;
the second portion of the elongate structure (102) contains the second virtual cross-section; and
the first portion of the elongate structure (102) and the second portion of the elongate structure (102) do not overlap each other.

20. The method of claim 18, wherein:
a first portion of the load is received by a first portion of the elongate structure (102);
the first portion of the elongate structure (102) contains the first virtual cross-section;
a second portion of the load is received by a second portion of the elongate structure (102);
the second portion of the elongate structure (102) contains the second virtual cross-section;
a third portion of the load is received by a third portion of the elongate structure (102);
the third portion of the elongate structure (102) contains the third virtual cross-section;
the third portion of the load is less than the first portion of the load; and
the third portion of the load is less than the second portion of the load.

* * * * *